US009462109B1

(12) United States Patent
Frazier Fields et al.

(10) Patent No.: US 9,462,109 B1
(45) Date of Patent: Oct. 4, 2016

(54) METHODS, SYSTEMS, AND DEVICES FOR TRANSFERRING CONTROL OF WIRELESS COMMUNICATION DEVICES

(71) Applicant: Motorola Mobility LLC, Chicago, IL (US)

(72) Inventors: Taneka L Frazier Fields, Lilburn, GA (US); Donald L Cantrell, Chicago, IL (US); Marc B Riley, Grayson, GA (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/961,299

(22) Filed: Dec. 7, 2015

(51) Int. Cl.
*H04M 3/00* (2006.01)
*H04M 1/725* (2006.01)
*H04M 1/60* (2006.01)
*H04W 4/02* (2009.01)

(52) U.S. Cl.
CPC ....... *H04M 1/72533* (2013.01); *H04M 1/6066* (2013.01); *H04W 4/025* (2013.01)

(58) Field of Classification Search
CPC ........... H04M 1/6066; H04M 1/7253; H04M 2250/02; H04M 1/72527; H04M 1/6058; H04W 4/025
See application file for complete search history.

(56) References Cited

U.S. PATENT DOCUMENTS

| | | | | |
|---|---|---|---|---|
| 2003/0073460 | A1* | 4/2003 | van Pelt | H04M 1/6066 455/556.1 |
| 2006/0166716 | A1* | 7/2006 | Seshadri | H04M 1/6033 455/575.2 |
| 2006/0166718 | A1* | 7/2006 | Seshadri | H04M 1/05 455/575.2 |
| 2007/0223725 | A1 | 9/2007 | Neumann et al. | |
| 2008/0101279 | A1* | 5/2008 | Russell | H04M 1/6066 370/328 |
| 2010/0220865 | A1* | 9/2010 | Martin | H04M 1/6058 381/59 |

* cited by examiner

*Primary Examiner* — Ajit Patel

(57) ABSTRACT

A wireless communication device can include one or more control circuits, a wireless communication circuit, and an audio output device. The one or more control circuits can receive audio source information identifying an audio source from a paired wireless communication device, and can detect whether the paired wireless communication device is within a communication radius. Where it is, the wireless communication device can receive single-channel audio information from the paired wireless communication device for delivery to the audio output device. However, where it is not, the wireless communication device can connect to the audio source using the audio source information, receive multi-channel audio information from the audio source, and deliver the multi-channel audio information to the audio output device.

20 Claims, 18 Drawing Sheets

METHODS, SYSTEMS, AND DEVICES FOR TRANSFERRING CONTROL OF WIRELESS COMMUNICATION DEVICES

BACKGROUND

1. Technical Field

This disclosure relates generally to electronic devices, and more particularly to wireless communication devices.

2. Background Art

The use of wireless electronic communication devices is becoming a ubiquitous part of life. Users of such devices rely upon them not only for communication, but also to maintain to-do lists, surf the Internet, maintain personal and business calendars, view videos, listen to audio recordings, and to stay up-to-date with friends, family, and co-workers. Such devices are used so readily, in large part, due to their portability. Portable energy sources like rechargeable batteries eliminate the need to be continually slip the surly bonds of being tethered to a power outlet, thereby allowing users to take devices with them wherever they may go.

Many wireless communication devices are equipped with interface circuitry for connection to various accessory devices. Illustrating by example, a smartphone may include an audio connector so that a headset and microphone can be attached. Alternatively, the smartphone may include a local area wireless communication circuit, such as a Bluetooth™ circuit, that wirelessly couples to an ear bud. Such interfaces are generally at least somewhat standardized so that a generic accessory, such as wireless ear buds, can work with a variety of devices.

Some accessory devices are quite small. For example, wireless headsets are commonly used with many portable electronic devices. The most compact headsets are manufactured as "in the ear" or "in the ear canal" ear buds. Ear buds generally include small speakers and fit into either the folds of the human ear or into the ear canal itself. It can be advantageous for ear buds to be as small as possible. Fashion conscious users may be reluctant to use a large earpiece that resembles a vintage hearing aid.

This desire to make ear buds smaller makes the design of such ear buds challenging. For example, there is very little room for a user interface along the housing of an ear bud device. In contrast to smart phones or other devices that can provide an infinite number of user interfaces, buttons, and controls on large touch screens, an ear bud may have only a single button. At the same time, it can be desirable to perform a variety of operations with the ear bud, including charging operations, volume control, pairing, and so forth. It would be advantageous to have improved wireless communication devices with limited user interfaces that are capable of performing sophisticated functions such as automatically detecting complementary accessories to preform advanced functions.

Figure 1:
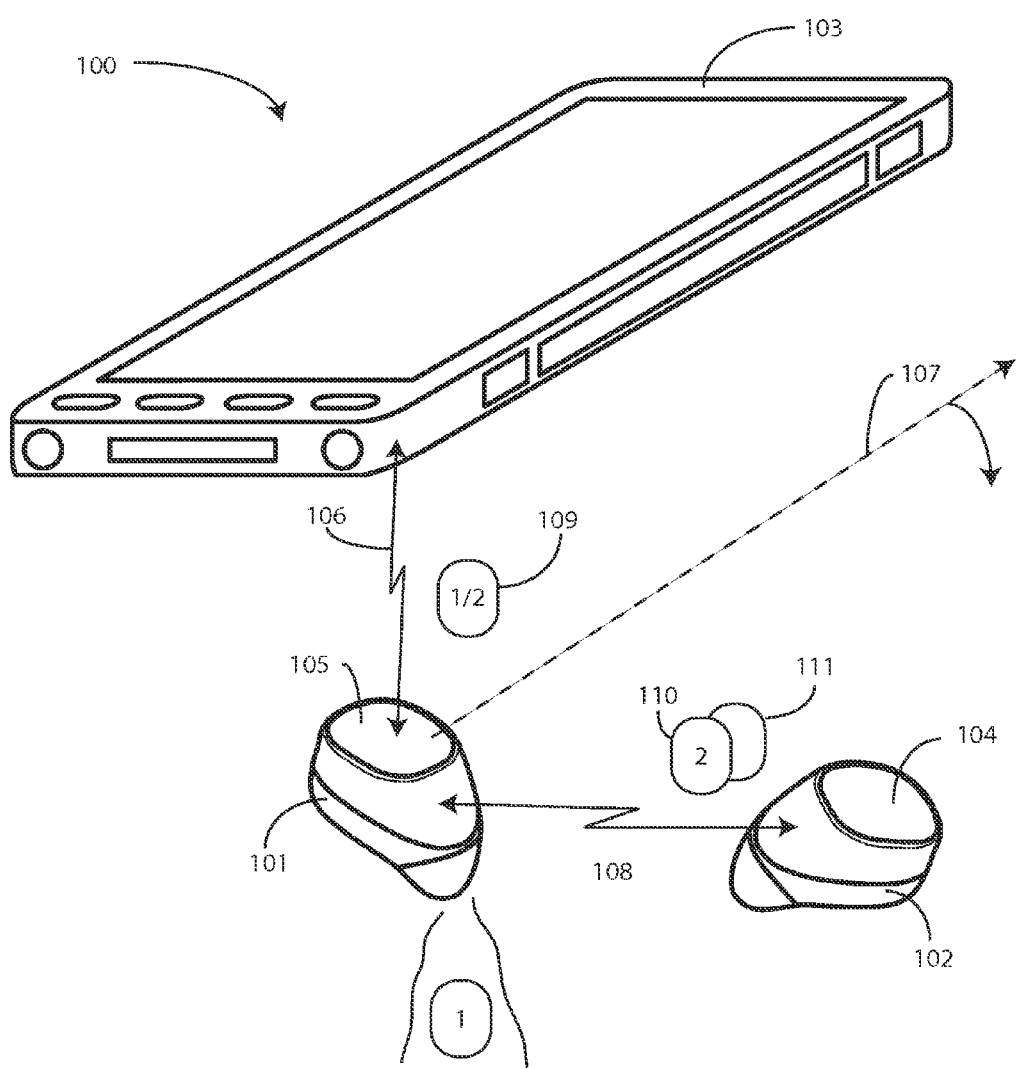
FIG. 1 illustrates one explanatory system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to configuring wireless communication devices in a master/slave operating structure, but with the ability for the slave device to take the role of master when not connected to the device identified as the master. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to wireless communication devices and/or user interface technology, improve the functioning of the wireless communication device itself by and improving the overall user experience to overcome problems specifically arising in the realm of the technology associated with wireless communication device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of configuring devices as master and slave to deliver stereo audio, but with the ability of the slave to deliver multi-channel monaural audio as described herein. The non-processor circuits may include, but are not limited to, a radio receiver, a radio transmitter, signal drivers, clock circuits, power source circuits, and user input devices. As such, these functions may be interpreted as steps of a method to perform the swapping of master operations between wireless communication devices. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. The term "substantially" is used to refer to an orientation inclusive of manufacturing tolerances. Accordingly, where the manufacturing tolerances are plus or minus one degree, "substantially orthogonal" means between 89 and 91 degrees. Reference designators shown herein in parenthesis indicate components shown in a figure other than the one in discussion. For example, talking about a device (10) while discussing figure A would refer to an element, 10, shown in figure other than figure A.

As noted above, many wireless communication devices, such as smartphones, tablet computers, multimedia players, and so forth, are equipped with interface circuitry for connection to accessory devices. Illustrating by example, a smartphone may include an audio connector so that a headset and microphone can be attached. Embodiments of the disclosure contemplate that users benefit from a richer audio experience when listening to stereo audio, i.e., with a right channel of multi-channel audio information being delivered to the right ear and a left channel of the multi-channel audio information being delivered to the left ear. However, all prior art accessories capable of delivering stereo audio in this format have two speakers coupled together. For example, a pair of wired headphones will have the left ear speaker and the right ear speaker coupled together. This occurs because users do not want to misplace one speaker or the other, as doing so would leave them listening to only a single audio channel of multichannel information.

Embodiments of the disclosure contemplate that users would prefer to have non-tethered solutions due to the fact that they are more compact, less visible, and more easily stowed, to mention just a few advantages offered by non-tethered solutions. For example, rather than having a bulky headset with a left speaker and a right speaker, a user may prefer to have two small, independent ear buds that deliver the same stereo performance. However, this desire gives rise to a problem: when two ear buds look just alike, which one is the right ear bud and which is the left? Additionally, if a person only wants to use a single ear bud at times, perhaps to listen to monaural audio in a single ear, how can this be done? Moreover, if ear buds are configured as master and slave, which ear bud is the master? Which is the slave? The last thing any users wants is to walk out of the house with a non-functioning slave ear bud, as this leaves them unable to listen to any audio content due to the absence of the master.

In short, as wireless audio devices gain momentum, embodiments of the disclosure contemplate that there is a need to move from the traditional, wired, two-speaker stereo devices to two separate wireless communication devices capable of delivering left channel audio and right channel audio, respectively. This need gives rise to problems, including determining which wireless communication device will channel the left channel audio and which will deliver the right channel audio? Additionally, if the devices are separated, perhaps when one is lost, how can the remaining wireless communication device deliver both channels?

Embodiments of the disclosure provide solutions to these problems. In particular, embodiments of the disclosure allow for two distinct and separate wireless communication devices to work as one unitary system to deliver stereo audio as would a prior art, two-speaker, tethered solution. Additionally, when the devices are separated, embodiments of the disclosure provide methods and techniques for the remaining device to deliver multi-channel monaural audio to the user. Embodiments of the disclosure further ensure that the remaining device is able to connect to the audio source, which may be a smartphone, tablet computer, multimedia player, or other device. Accordingly, with embodiments of the disclosure, a user who wants to use a single wireless ear bud can grab either ear bud of a pair, confidently knowing that whichever ear bud he selects will successfully connect to his smart phone and will allow him to hear both channels of multi-channel audio information in a single ear.

Since it is possible that both peer devices may appear identical in appearance, it can be difficult for the user to remove the correct device when there is a desire to switch from stereo to mono mode. The device that is connected to the audio source is referred to as the master. The slave is the peer device that is connected to the master. As previously stated, when the slave is connected/disconnected music can be seamlessly changed from stereo to mono and vice versa since the master remains connected to the audio source. However, if the master is removed, this leaves a slave device and an audio source that is not connected and thus an interruption in music. To minimize this interruption, while the peer devices are connected, the master should send connection information about the audio source to the slave. Now, when the master is disconnected, the slave can issue a connection to the audio source resulting in the slave device now becoming the master. Music can be restarted with minimal music interruption.

In one embodiment, two wireless communication devices are each configured as ear buds for insertion into the ear of a user. These wireless communication devices can be referred to as "peer" devices in that they have been paired together through a formal pairing operation. One wireless device is paired to another, referred to as the "paired" wireless device.

When a single wireless communication device is being used with an audio source, such as a smartphone or media player, that wireless communication device should deliver both left and right audio channels to a user's ear as monaural or monophonic output where the right audio channel and the left audio channel are blended together in a single channel of transmission. Thus, when a user purchases a smartphone and a single wireless communication device, the wireless communication device would work in this fashion, delivering both left and right audio channels to the user's ear.

However, if the user subsequently purchases a second wireless communication device and pairs it to the first. Now, to provide proper stereo performance, the first ear bud should play one of the right channel or the left channel while the second ear bud plays the other of the right channel or the left channel, thereby providing a stereo experience with two separate devices. (Determining which device plays the left channel or right channel can be user configurable via a user interface, actuation of a user interface actuator, such as pressing a button, delivering a voice command, and so forth. Alternatively, it can be factory defined, or even dynamically assigned as a function if which wireless communication device is coupled to an audio source.) In one or more embodiments, only one ear bud will be in communication with the smartphone. Thus, when music is playing that ear bud will receive multi-channel audio information, separate out single-channel audio information, deliver one channel to a local loudspeaker or other output device, and deliver the other channel to the other ear bud. Advantageously, in one or more embodiments the multi-channel audio information can be split and recombined seamlessly based upon whether one peer device or two peer devices are working with the audio source. This can occur without music interruption or manipulating the audio source.

In one or more embodiments, the wireless communication device in communication with the audio source is referred to as the master device. For example, if an ear bud in a user's right ear is communicating with the user's smart phone to receive music, this ear bud will be defined as the master device. If a second device is present, e.g., another ear bud in the user's left ear, this device will communicate with the ear bud in the user's right ear and will be identified as the slave device.

Since it is possible that both peer devices may appear identical in appearance, it can be difficult for the user to remove the correct device when there is a desire to switch from stereo mode of operation to a monaural mode of operation. If, for example, the slave is removed from the system, the master simply recombines right and left channels and delivers this multi-channel audio information to a local loudspeaker or other output device. However, if the master is removed from the system, this leaves a slave device only. In particular, the slave device that was communicating only with the master. In one embodiment, to ensure that music playback is uninterrupted, when initially working together the master transmits not only audio information, but also connection information about the audio source, which in this example is a smartphone. Advantageously, when the master is disconnected, the slave can issue a connection request to the audio source. Additionally, the slave can now take the role of the master, receiving multi-channel audio information from the audio source for delivery to a local loudspeaker or other output device. Thus, the music can continue with minimal music interruption.

Embodiments of the disclosure provide methods, systems, and devices for wirelessly streaming single-channel audio information or multi-channel audio information from an audio source to one or more wireless communication devices. One or more methods for initially configuring the wireless communication devices are also provided. In one embodiment, two identical wireless communication devices may be employed in tandem to form a single, multi-channel user interface system. As such, a user may purchase one wireless communication device initially for listening to monaural audio information. For example, the user may one only one wireless communication device for making hands-free telephone calls. The user may then purchase a second, identical wireless communication device at a later time, combining it with the first, to listen to stereo audio information with a right channel being delivered to the right ear and a left channel being delivered to the left ear. For example, they may want to listen to musical content in stereo. The wireless communication devices operate in a fashion that enables stereo pairing and streaming with an audio device.

In one or more embodiments, wireless communication devices are configured as small, independent earpieces suitable for insertion into a user's ear canal. Using this construction, the user is able to insert a wireless communication device into each ear for a nearly undetectable listening experience. As the wireless communication devices are not physically coupled to each other, there is no wire or harness spanning the user's head. In one or more embodiments, each wireless communication device is capable of maintaining a symmetrical point-to-multipoint connection to either the audio source or the paired wireless communication device. However, as will be described in more detail below, in one or more embodiments only one wireless communication device is in communication with the audio source at any given time. This device is known as the master. The other, paired wireless communication device is in communication with the master and is referred to as the slave. Accordingly, the master wireless communication device takes on a dominant role, maintaining a point-to-multipoint connection, while the slave wireless communication device takes on a subdominant role, maintaining only a point-to-point connection with the master.

In one or more embodiments, this dominant-subdominant relationship may be transferred and changed based upon any of a number of criteria. Illustrating by example, when the devices are working together, i.e., where master and slave are both within a predefined communication radius, the slave receives, with a wireless communication circuit, single-channel audio information from the master and delivers the single-channel audio information to a local loudspeaker or other audio output device. However, when the slave is removed from the system, i.e., where the master is is outside the communication radius, the slave can then connect, with its wireless communication circuit, to the audio source. In one embodiment, the slave sues audio source information received from the master to identify the audio source. The slave then takes the role of the master, receiving multi-channel audio information from the audio source and delivering the multi-channel audio information to a local loudspeaker or other audio output device.

In one or more embodiments, the master device and slave device are each equipped with identical functional modules. These modules, which may be configured as embedded software operable with one or more control circuits, enable the particular wireless communication device to serve as the dominant wireless communication device, i.e., the master, or the subdominant wireless communication device, i.e., the slave. Since any given wireless communication device shipping from the factory may become either dominant or subdominant depending upon context, in one embodiment each wireless communication device can be capable of pairing with an audio source. Each wireless communication device is capable of negotiating a dominant-subdominant relationship with a peer device. Each wireless communication device can be capable of establishing a point-to-multipoint connection so as to be capable of serving as the master. Each wireless communication device can be capable of receiving multi-channel audio information and distributing one channel to a local loudspeaker, while distributing another channel to the subdominant device. Each of these functions will be described in more detail with the discussion of the figures below.

Turning now to FIG. 1, illustrated therein is one explanatory system 100 in accordance with one or more embodiments of the disclosure. The system includes an audio source 103, a first wireless communication device 101, and a second wireless communication device 102. For ease of discussion, each of the first wireless communication device 101 and the second wireless communication device 102 is shown illustratively as a wireless ear bud. However, embodiments of the disclosure are applicable to any number of other wireless communication devices that are operable with an audio source 103. Here, the audio source 103 is shown as a smartphone for illustrative purposes. However, it should be obvious to those of ordinary skill in the art having the benefit of this disclosure that other audio sources may be substituted for the explanatory smartphone of FIG. 1. For example, the audio source 103 could equally be a conventional desktop computer, palm-top computer, a tablet computer, a gaming device, a media player, or other device. Accordingly, numerous other applications for embodiments of the disclosure will be obvious to those of ordinary skill in the art having the benefit of this disclosure.

Each of the first wireless communication device 101 and the second wireless communication device 102 can, in one embodiment, include one or more user interface actuators 104,105 that allow a user to control the operation of the first wireless communication device 101 and the second wireless communication device 102, respectively. As will be described in more detail below, in one embodiment the user interface actuators 104,105 are configured as capacitive touch surfaces along a housing. However, in other embodiments the user interface actuators 104,105 can be configured as push buttons, slider switches, touch pads, rocker switches, or other devices. Other examples of user interface actuators 104,105 include user actuation targets presented as virtual keys on a touch sensitive display. Still others can comprise voice commands delivered to a voice control interface. Even more others will be obvious to those of ordinary skill in the art having the benefit of this disclosure.

In one embodiment, the first wireless communication device 101 is configured to establish a wireless communication channel 106 with the audio source 103. Where the second wireless communication device 102 is within a predefined communication radius 107, the first wireless communication device 101 can also establish a second communication channel 108 with the second wireless communication device 102, thereby making a point-to-multipoint communication connection with both the audio source 103 and the peer device, i.e., the second wireless communication device 102. In one embodiment, each of the wireless communication channel 106 and the second communication channel 108 comprise local area, ad-hoc communications using a protocol such as Bluetooth™.

In this illustrative embodiment, the first wireless communication device 101 receives multi-channel audio information 109 from the audio source 103. Where two wireless communication devices are in use, the first wireless communication device 101 receives the multi-channel audio information 109, separates one channel, such as the right channel for delivery to a local loudspeaker or other audio output device. The first wireless communication device then transmits single-channel audio information 110 to the second wireless communication device 102. In one or more embodiments, the first wireless communication device 101 also transmits audio source information 111, including connection information for the audio source 103, to the second wireless communication device 102. Advantageously, if the first wireless communication device 101 is for some reason ever removed from the system 100, the second wireless communication device 102 can use the audio source information 111 to issue a connection request to the audio source 103. Where this request is successful, the second wireless communication device 102 can become the dominant communication device by establishing the wireless communication channel 106 directly with the audio source 103.

In one embodiment, the multi-channel audio information 109 comprises stereo audio information, while the single-channel audio information 110 comprises one of right channel audio information or left channel audio information. In this illustrative embodiment, the single-channel audio information 110 comprises a right channel of stereo audio information. Illustrating by example, when the audio source 103 transmits multi-channel, stereo content such as an MP3 recording of a song, the first wireless communication device 101 receives the multi-channel audio information 109 as stereo content, selects one channel from the multi-channel audio information 109 for delivery to a local loudspeaker or other audio output device, and then delivers the other channel, i.e. single-channel audio information 110, to the second wireless communication device 102. It should be noted that stereo music content is only one example of multi-content information that can be delivered in accordance with one or more embodiments of the disclosure, as information other than channel content may be transmitted as well. Data content may be interlaced with other content, such as audio or video. For example, the content may include left channel audio, right channel audio, and data like call initiation, transfer, or drop requests. Other content or information suitable for use with embodiments of the disclosure will be obvious to those of ordinary skill in the art having the benefit of this disclosure.

As mentioned above, in one or more embodiments the first wireless communication device 101 and the second wireless communication device 102 are configured to look basically the same. In such an embodiment, each of the first wireless communication device 101 and the second wireless communication device 102 can be symmetrical in geometric shape, and may be capable of placement in either the right or left ear. In such an embodiment, to determine, for example, whether the first wireless communication device 101 should play with a local loudspeaker the right channel or the left channel, it can be configured with an orientation device so as to determine which ear it is in. Where included, the orientation device can determine a physical orientation so as to transmit the proper channel to the second wireless communication device 102. For example, if the first wireless communication device 101 determines it is placed in the left ear, one or more control circuits of the first wireless communication device 101 can select the left channel from the multi-channel audio information 109 for delivery to its loudspeaker, while delivering the right channel to the second wireless communication device 102, and vice versa. One example of a suitable orientation device is an accelerometer, which can determine in which direction gravity is acting, and therefore in which ear each device is disposed. Where no orientation device is included, determining which wireless communication device plays the left channel or right channel can be user configurable. For example, a user may press a button, actuate a user interface actuator, deliver a voice command, and so forth.

In this illustrative embodiment, the first wireless communication device 101 has taken on a dominant role and serves as the master device. In taking on that role, the first wireless communication device 101 maintains a point-to-multipoint connection with both the second wireless communication device 102 and the audio source 103. This leaves the second wireless communication device 102 taking a subdominant role and serving as the slave device. In the subdominant role, the second wireless communication device 102 maintains only a communication channel 108 with the first wireless communication device 101. Thus, the audio source 103 delivers the multi-channel audio information 109 to a single wireless communication device, while that dominant wireless communication device delivers single-channel audio information 110 to the subdominant wireless communication device.

The determination of the ascendancy relationship may be accomplished in a variety of ways. In one embodiment, when a pair of wireless communication devices is powered on, the first one to be powered up may presume to be dominant. In an alternate embodiment, as the dominant wireless communication device maintains a point-to-multipoint connection, the dominant wireless communication device will generally consume more battery power than will the subdominant wireless communication device. Thus, which wireless communication device serves as the master device may be determined as a function of the relative energy storage levels within each wireless communication device. In yet another embodiment, one wireless communication device is identified, in a default state, as the master while another is identified, in a default state, as the slave. In one embodiment this identification occurs during a pairing process, such as the one described below with reference to FIGS. 13-15 and 18-19. Other techniques for determining slave and master will be obvious to those of ordinary skill in the art having the benefit of this disclosure.

Figure 2:
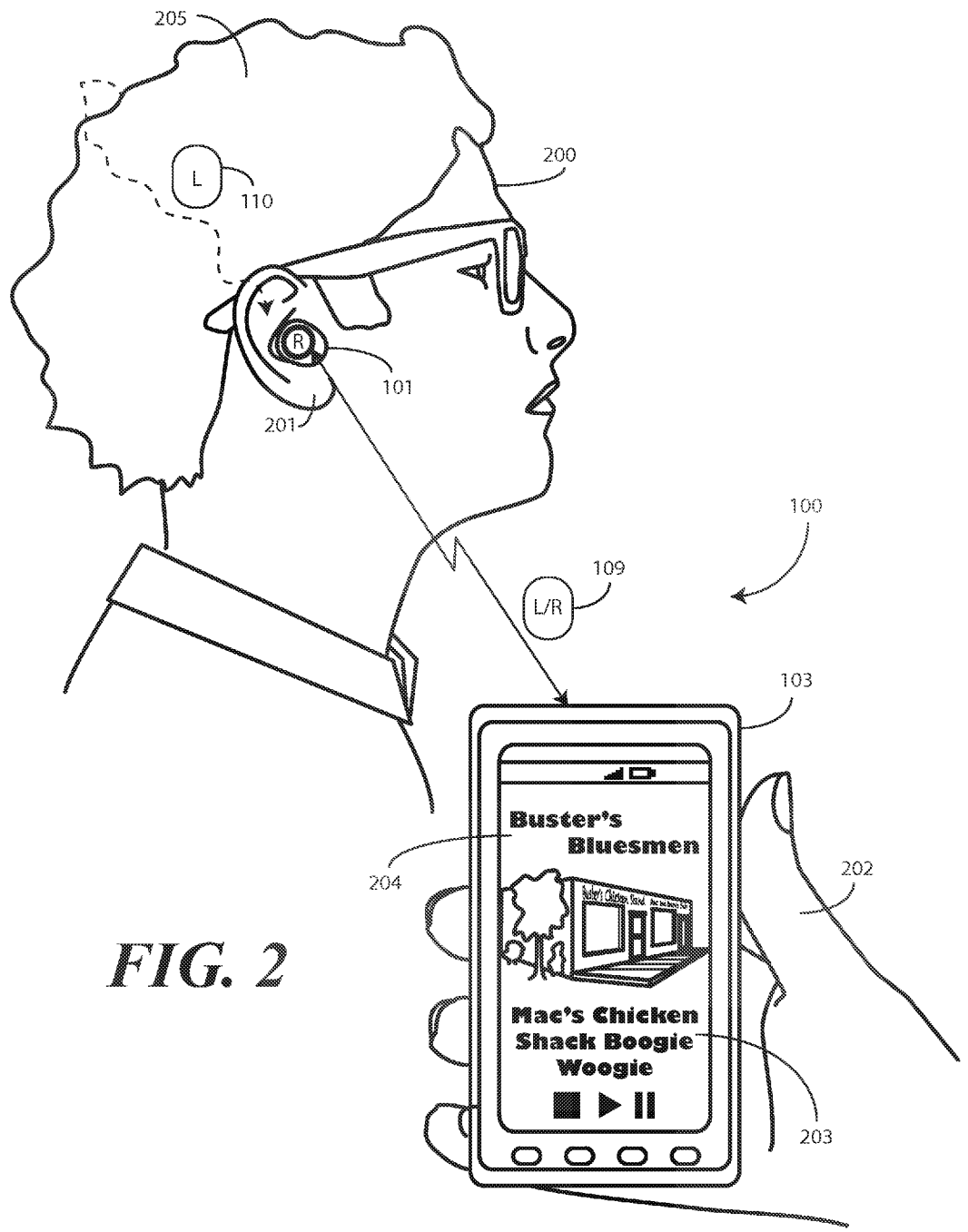
FIG. 2 illustrates a user with one explanatory system delivering stereo audio in accordance with one or more embodiments of the disclosure.
Figure 3:
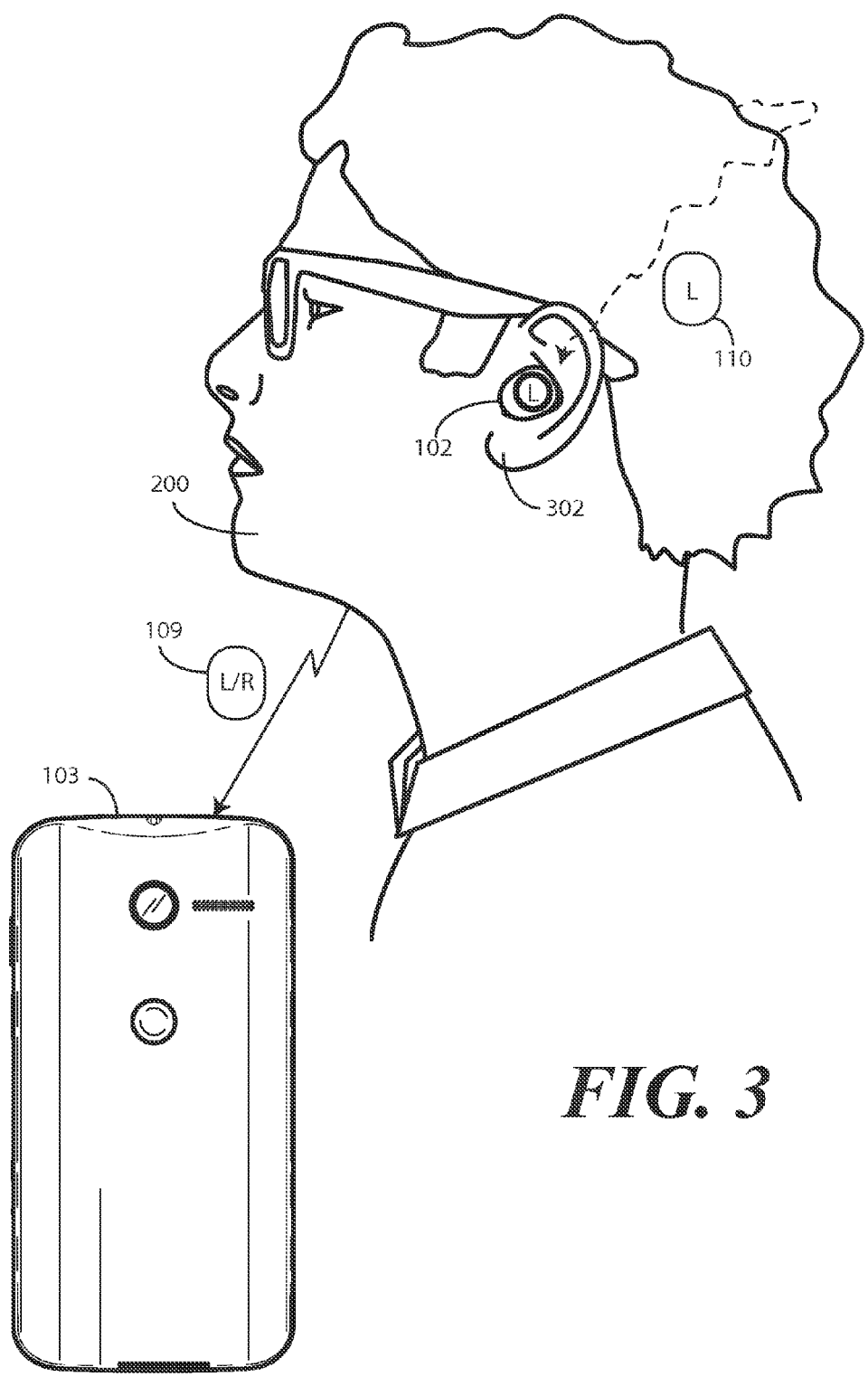
FIG. 3 illustrates the user with the explanatory system delivering stereo audio in accordance with one or more embodiments of the disclosure.

Turning now to FIGS. 2 and 3, illustrated therein is the system 100 of FIG. 1 in operation. A user 200 is shown using the system 100, with the user 200 shown with a right profile view in FIG. 2 and a left profile view in FIG. 3. As shown, the user 200 has disposed the first wireless communication device 101 in the right ear 201, while the second wireless communication device 102 is disposed in the left ear 302.

The user 200 is holding the audio source 103 in their hand 202. The audio source 103 can be a digital audio player, such as a MP3 player. Alternatively, the audio source 103 may be a personal computer or other portable computing device. In this illustrative embodiment, the audio source 103 comprises a smartphone capable of both making telephone calls and storing and playing multi-channel audio content.

As shown in FIG. 2, the user 200 has configured the audio source 103 as a music player, with the track, "Mac's Chicken Shack Boogie Woogie," 203 by the artist Buster and his Bluesmen 204, being played. Album cover art of this sensational tune is presented on a display of the audio source 103.

The first wireless communication device 101 has been paired with the second wireless communication device 102 in accordance with the method described below with reference to FIGS. 13-15 and 18-19. Accordingly, the first wireless communication device 101 has taken on a dominant role and serves as the master device. In taking on that role, the first wireless communication device 101 maintains a point-to-multipoint connection with both the second wireless communication device 102 and the audio source 103. This leaves the second wireless communication device 102 taking a subdominant role and serving as the slave device. In the subdominant role, the second wireless communication device 102 maintains only a communication channel 108 with the first wireless communication device 101.

In this embodiment, the audio source 103 delivers the multi-channel audio information 109 corresponding to the Buster and his Bluesmen 204 tune, "Mac's Chicken Shack Boogie Woogie" 203, to the first wireless communication device 101. The first wireless communication device receives this multi-channel audio information 109, selects the right channel, and delivers it to a local loudspeaker. Single-channel audio information 110, i.e., the left channel in this example, is then wirelessly delivered to the second wireless communication device 102. Accordingly, the user 200 experiences a satisfying stereo sound wirelessly, with no wire or harness spanning the user's head 205.

As shown in FIGS. 2-3, in one embodiment the first wireless communication device 101 is in communication with the audio source 103, while the second wireless communication device 102 is in communication with the first wireless communication device 101. The first wireless communication device 101 receives multi-channel audio information 109 from the audio source 103 and delivers a first channel content to a locally disposed loudspeaker. The first wireless communication device 101 then delivers a second channel content to the second wireless communication device 102. In one or more embodiments, each of the first wireless communication device 101 and the second wireless communication device can include a synchronization module to ensure that the single-channel audio information delivered to the locally disposed loudspeaker of the first wireless communication device 101 and the single-channel audio information 110 delivered to the second wireless communication device 102 are synchronized temporally. For instance, one of the wireless communication devices may temporarily buffer received content to allow content to be delivered from both wireless communication devices simultaneously.

Figure 4:
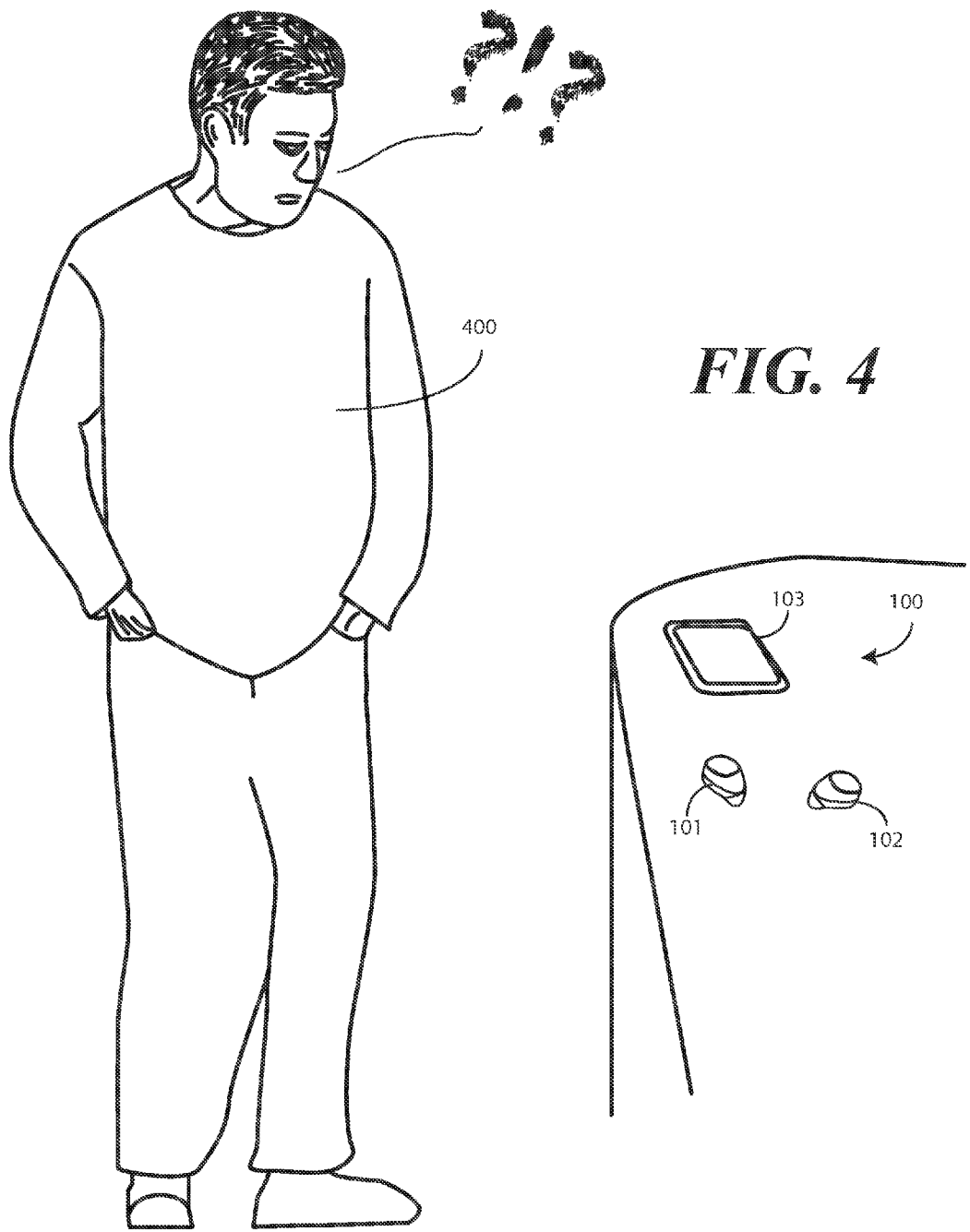
FIG. 4 illustrates another user with an explanatory system in accordance with one or more embodiments of the disclosure.

Turning now to FIG. 4, another user 400 is shown with a system 100 in accordance with one or more embodiments of the disclosure. This user 400 knows that, in one or more embodiments, the first wireless communication device 101 and the second wireless communication device 102 are configured in a dominant/subdominant relationship with one serving as the master and another serving as the slave. The user 400 also has experience with prior art systems, and knows that in prior art systems a master might pair to the audio source 103, while the slave only pairs to the master. Here, the user 400 wants to go jogging. He also wants to listen to "Mac's Chicken Shack Boogie Woogie" (203), by Buster and his Bluesmen (204), as this song is the user's "adrenaline jam" that propels him up hills when he gets tired.

However, the user 400 only wants to use one ear bud so that the other ear will be free to listen for the sounds of cars, bicyclists, muggers, policemen, and other interesting individuals that comprise the colorful tapestry that is urban running. The user 400 is unnecessarily confused, because he does not want to inadvertently grab the slave. He thinks that by doing so, he will not be able listen to "Mac's Chicken Shack Boogie Woogie" (203) by Buster and his Bluesmen (204) without the master. Fortunately for the user, the system 100 allows either the first wireless communication device 101 or the second wireless communication device 102 to step in and serve as the master, regardless of its prior, default, or other states. Advantageously, the user 400 can grab the audio source 103 and either the first wireless communication device 101 or the second wireless communication device 102 with the confidence that "Mac's Chicken Shack Boogie Woogie" (203) by Buster and his Bluesmen (204) will sound crisp and clear without the other device when the run reaches "cardiac hill" on Peachtree Street.

Specifically, in one or more embodiments, each of the first wireless communication device 101 and the second wireless communication device 102 includes one or more control circuits and a wireless communication circuit operable with the one or more control circuits. Further, each of the first wireless communication device 101 and the second wireless communication device 102 includes an audio output device operable with the one or more control circuits. To be able to take on either the dominant or subdominant role as a function of the configuration or number of components of the system 100, in one or more embodiments the one or more control circuits are configured to receive audio source information (111) identifying a remote electronic device, e.g., audio source 103, from a paired wireless communication device. Thus, if the first wireless communication device 101 begins operation as the subdominant device, it will receive the audio source information (111) identifying the audio source 103 from the second wireless communication device 102.

The one or more control circuits of the first wireless communication device 101 can then detect, with its wireless communication device, whether the second wireless communication device 102 is within the communication radius (107), i.e., whether the second wireless communication device 102 is an active component of the system 100. Where it is, the first wireless communication device 101 can continue operation as the subdominant device. Specifically, where the second wireless communication device 102 is within the communication radius (107) the first wireless communication device can receive, with its wireless communication circuit, single-channel audio information (110) from the first wireless communication device 101 and can deliver the single-channel audio information (110) to a local loudspeaker or other audio output device.

However, in this example the user 400 only wants to use a single ear bud. Accordingly, what happens if the user 400 grabs only the first wireless communication device 101 and the audio source 103? When the user 400 goes running, the second wireless communication device 102, initially the dominant master device, will be outside of the communication radius (107). Advantageously, when this occurs the first wireless communication device 101 can become the master. Specifically, in one embodiment where the second wireless communication device 102 moves outside the communication radius, the first wireless communication device 101 can connect, with its wireless communication circuit, to the audio source 103 using the audio source information (111) identifying the audio source 103 received from the second wireless communication device 102. The first wireless communication device 101 can then receive, with its wireless communication circuit, multi-channel audio information (109) from the audio source 103 and deliver the multi-channel audio information (109) to its local loudspeaker or other audio output device.

Figure 5:
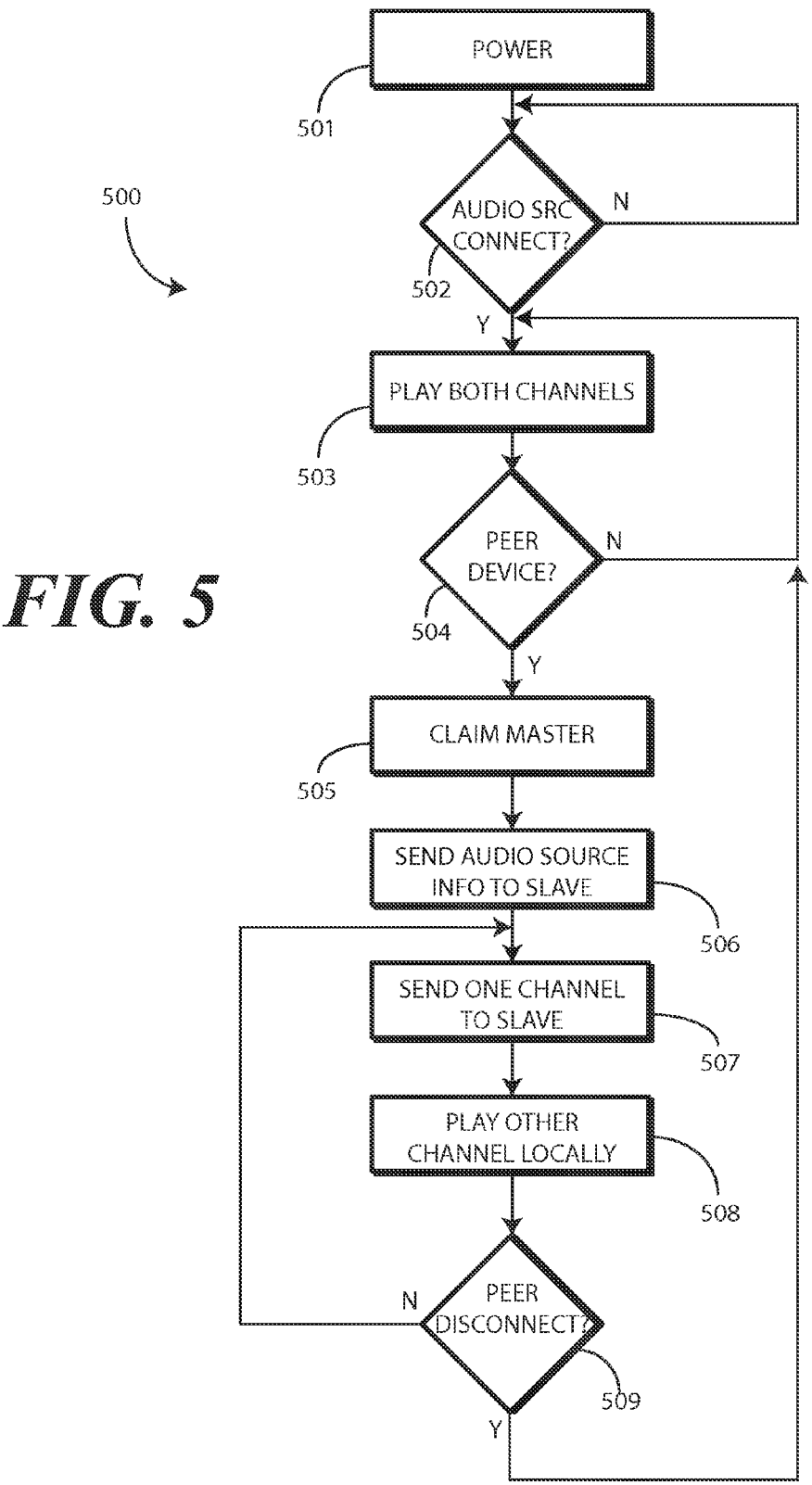
FIG. 5 illustrates one explanatory method in accordance with one or more embodiments of the disclosure.
Figure 6:
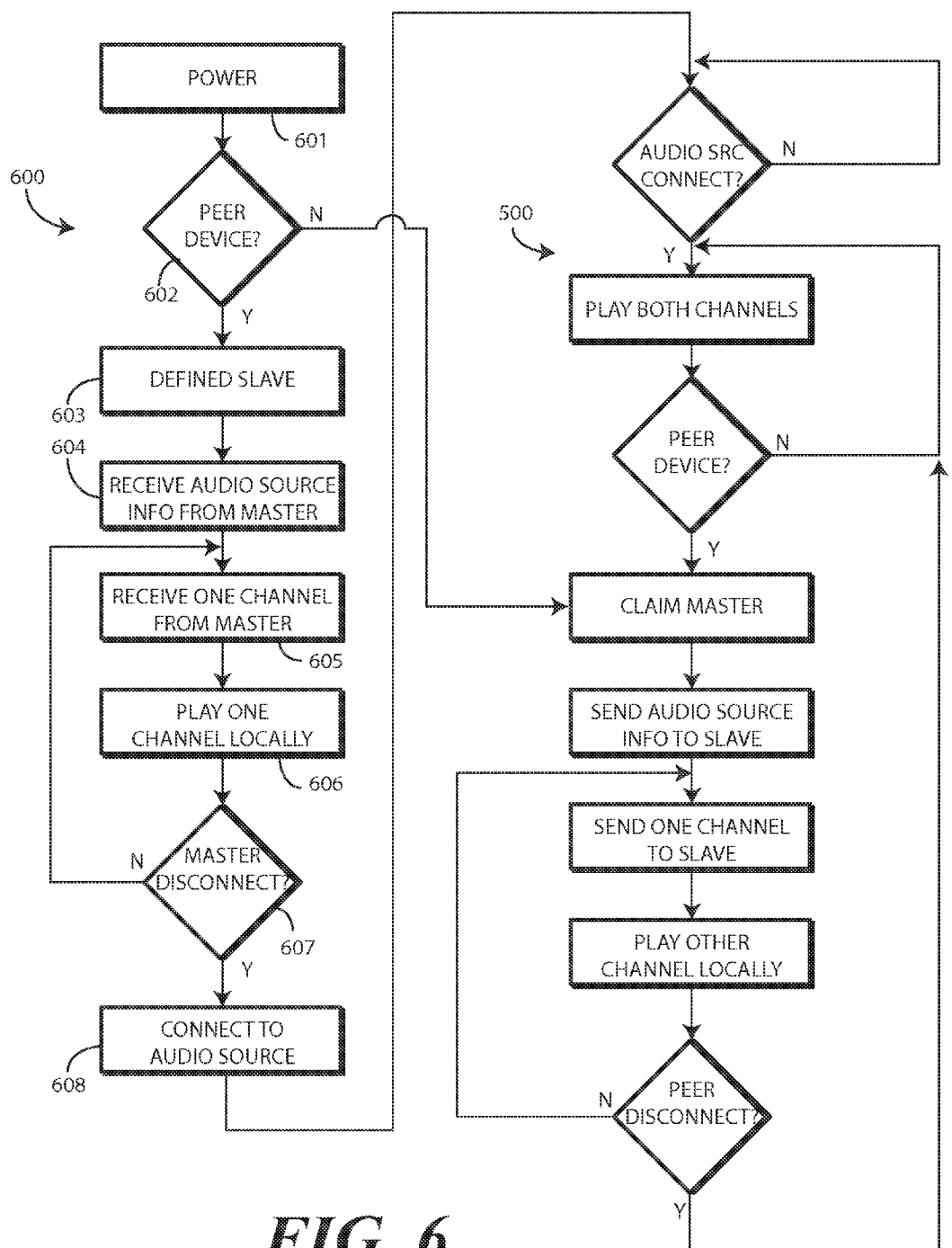
FIG. 6 illustrates another explanatory method in accordance with one or more embodiments of the disclosure.

In short, despite grabbing the audio source (103) and the initial slave, the slave becomes the master and the user 400 triumphantly hears "Mac's Chicken Shack Boogie Woogie" (203) by Buster and his Bluesmen (204). Methods for performing this handoff are shown in FIGS. 5-6 below. FIG. 5 illustrates a method (500) for a wireless communication device initially operating in the dominant, or master mode of operation, while FIG. 6 illustrates a method (600) for a wireless communication device initially operating in the subdominant, or slave mode of operation. As noted above, one method for defining which wireless communication device initially operates in the dominant mode will be described below with reference to FIGS. 13-15 and 18-19.

Turning now to FIG. 5, illustrated therein is a method 500 for a first wireless communication device (101) initially operating in the dominant, or master mode of operation. After powering ON at step 501, the first wireless communication device (101) will attempt to connect to an audio source (103) by establishing a wireless communication channel (106). Whether this connection is successful is determined at decision 502.

At step 503, the method 500 receives, with a wireless communication circuit of the first wireless communication device (101), multi-channel audio information (109) across a network from an audio source (103). In one embodiment, the audio source (103) is a remote electronic device, such as a smartphone or media player. At step 503 the method 500 also includes delivering, with one or more control circuits of the first wireless communication device (101) that are operable with the wireless communication circuit, the multi-channel audio information (109) to an output device of the first wireless communication device (101). In one embodiment, the output device is a loudspeaker. Where the multi-channel audio information (109) comprises stereo audio information, a user would thus hear both the right channel and the left channel of the stereo audio information in the same ear as monaural sound.

Where a "peer" wireless communication device is within a predefined communication radius (107), either this second wireless communication device (102) or the first wireless communication device (101) may attempt to establish a communication channel (108) between the devices. Whether this is successful is determined at decision 504.

Where it is, the first wireless communication device (101) identifies, at step 505 with its one or more control circuits, that it is the dominant, master device. This occurs because the first wireless communication device (101) is connected to an audio source (103) by a wireless communication channel (106) and is receiving multi-channel audio information (109) across a network from the audio source (103).

After this occurs, at step 506 the first wireless communication device (101) delivers, with its wireless communication circuit, audio source information (111) identifying the audio source (103), i.e., the remote electronic device from which transmission of the multi-channel audio information (109) originated, to the second wireless communication device (102). Should the first wireless communication device (101) be removed from the system, the second wireless communication device (102) can use the audio source information (111) to establish a wireless communication channel (106) with the audio source (103) to become the master.

At step 507, the first wireless communication device (101) also delivers, with its wireless communication circuit, single-channel audio information (110) from the multi-channel audio information (109) to the second wireless communication device (102). If, for example, the multi-channel audio information (109) was stereo audio information, the first wireless communication device (101) may deliver the right channel to the second wireless communication device (102) at step 506.

At step 508, the first wireless communication device (101) delivers, with one or more control circuits operable with its wireless communication circuit, single-channel audio information (110) from the multi-channel audio information (109) to its output device, which in one embodiment is a loudspeaker. If, for example, the multi-channel audio information (109) was stereo audio information, and the first wireless communication device (101) delivered the right channel to the second wireless communication device (102) at step 506, at step 508 the first wireless communication device (101) can deliver the left channel to its local loudspeaker.

Embodiments of the disclosure contemplate that in some instances a wireless communication device may leave the system. In a simple example, a runner may inadvertently lose one of the ear buds. In the example described above with reference to FIG. 4, a user (400) simply wanted to use a single ear bud for safety. Other reasons why this can occur will be obvious to those of ordinary skill in the art having the benefit of this disclosure. Whether a peer device, e.g., the second wireless communication device (102) moves outside the predefined communication radius (107) and disconnects from the first wireless communication device (101) is determined at decision 509. Accordingly, in one embodiment decision 509 comprises detecting, with one or more control circuits of the first wireless communication device (101), whether the second wireless communication device (102) disconnects from the first wireless communication device (101).

Where this does not occur, step 507 and step 508 repeat. However, where the second wireless communication device (102) disconnects from the first wireless communication device (101), the first wireless communication device (101) can return to step 503 and deliver the multi-channel audio information (109) to an output device of the first wireless communication device (101) in response to the disconnecting. The user would thus hear both the right channel and the left channel of the stereo audio information in the same ear as monaural sound again with minimal disruption.

Turning now to FIG. 6, illustrated therein is a method 600 for a second wireless communication device (102) initially operating in the subdominant, or slave mode of operation. After powering ON at step 601, the first wireless communication device (101) will attempt to connect to the master device, which in this example would be the first wireless communication device (101). Whether this connection is successful is determined at decision 602.

Where it is, i.e., where a "peer" wireless communication device is within a predefined communication radius (107), either the second wireless communication device (102) or the first wireless communication device (101) establishes a communication channel (108) between the devices, the second wireless communication device (102) identifies, at step 603 with its one or more control circuits, that it is the subdominant, slave device. This occurs because the first wireless communication device (101) is connected to the audio source (103) by the wireless communication channel (106), and the second wireless communication device (102) is connected instead to the first wireless communication device (101) by way of a second communication channel (108).

The remaining steps are then largely complementary to the steps of FIG. 5. For instance, at step 604 the second wireless communication device (102) can receive, with its wireless communication circuit, audio source information (111) identifying a remote electronic device serving as the audio source (103) from which transmission of any single-channel audio information (110) received at step 605 originated. At step 605, the second wireless communication device (102) can receive the single-channel audio information (110) across a network from the first wireless communication device (101). At step 606, the second wireless communication device can deliver, with one or more control circuits operable with its wireless communication circuit, the single-channel audio information (110) to an output device, which in one embodiment is a loudspeaker.

As noted above, embodiments of the disclosure contemplate that in some instances a wireless communication device may leave the system. Whether the master device, i.e., the first wireless communication device (101) of this example, leaves the system is determined at decision 607. Said differently, in one embodiment decision 607 comprises detecting, with one or more control circuits, the first wireless communication device (101) disconnecting from the wireless communication circuit of the second wireless communication device (102).

Where this occurs, the second wireless communication device (102) can at step 608 connect, using the audio source information received at step 604, to the audio source (103). In one embodiment, the second wireless communication device (102) can establish a wireless communication channel (106) directly with the audio source (103). Where this is successful, the second wireless communication device (102) becomes the new dominant, master, and executes the method 500 of FIG. 5. Should the original master return to the system, it may attempt to connect to the audio source (103). However, upon discovering that the second wireless communication device (102) is now communicating over the wireless communication channel (106) with the audio source (103), the first wireless communication device (101) will attempt to connect to the second wireless communication device (102) at decision 602, and where successful, will define itself as the subdominant, slave device at step 603. Thus, the method can hand off the dominant relationship to keep any interruptions in the delivery of music or other information to a minimum.

A brief discussion of the configuration of the first wireless communication device (101) and the second wireless communication device (102) is now in order. When a user first purchases wireless communication devices that are to be used in tandem, they generally must be "paired" with each other. A description of one method of pairing is described below with reference to FIGS. 13-15 and 18-19 below, after a brief description of explanatory hardware of the first wireless communication device (101) and the second wireless communication device (102) in FIGS. 7-10 below.

Figure 7:
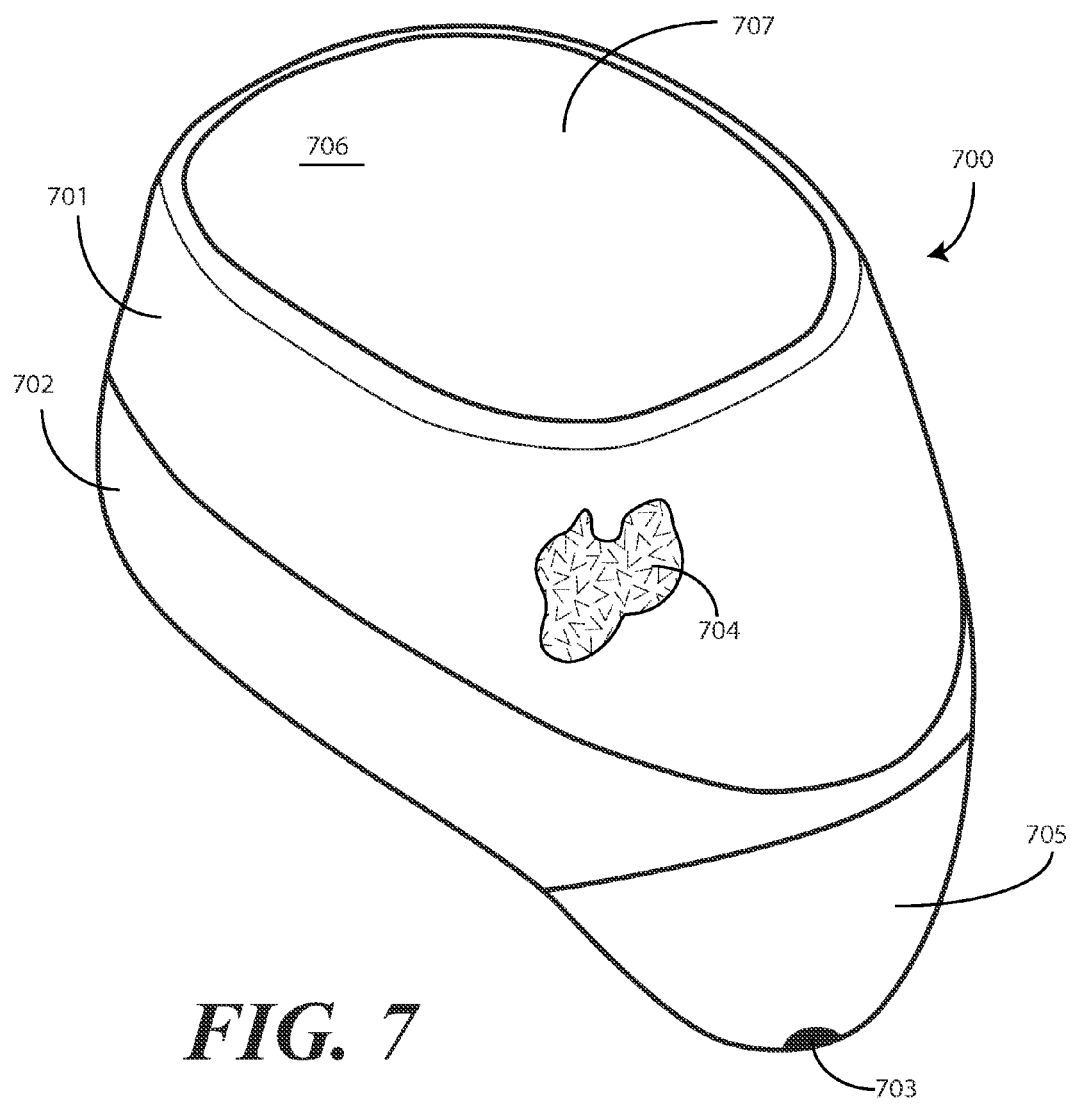
FIG. 7 illustrates one explanatory wireless communication device in accordance with one or more embodiments of the disclosure.

Turning now to FIG. 7, illustrated therein is one example of a wireless communication device 700 configured in accordance with one or more embodiments of the disclosure. The wireless communication device 700 of FIG. 7 could be used as either the first wireless communication device (101) or the second wireless communication device (102) in the examples above. As noted above, for ease of discussion the wireless communication device 700 will be shown illustratively as a wireless ear bud. However, embodiments of the disclosure are applicable to any number of other wireless communication devices, especially those having limited user interfaces. Accordingly, numerous other applications for embodiments of the disclosure will be obvious to those of ordinary skill in the art having the benefit of this disclosure.

The illustrative wireless communication device 700 of FIG. 7 includes an upper housing 701 attached to a lower housing 702. A circuit assembly is disposed within the wireless communication device 700, as well as a rechargeable battery, an acoustic driver, and other components.

In one or more embodiments, either the upper housing 701 or the lower housing 702 can define a microphone port to direct acoustic energy to one or more microphones of the circuit assembly. For example, such microphone ports can be disposed along the housing members to define acoustic beams along which acoustic energy is received. When the wireless communication device 700 is positioned in a user's ear, an acoustic beam can be directed toward the user's mouth so that the wireless communication device 700 can be used as a two-way communication device.

In the illustrative embodiment of FIG. 7, the lower housing 702 defines an acoustic driver port 703. An acoustic driver can be positioned within the acoustic driver port 703. When the wireless communication device 700 is positioned within the user's ear, the acoustic driver can deliver acoustic energy through the acoustic driver port 703 to the user's eardrum.

In one or more embodiments, the housing members are surrounded, or at least partially surrounded, by a soft, outer rubber layer 704. The soft, outer rubber layer 704, while optional, aids in user comfort by providing a soft surface against the contours of the user's ear. A cushion element 705 can be attached to the lower housing 702 to provide an acoustic seal between a user's ear canal and the lower housing 702. The cushion element 705 can be manufactured in varying sizes so that the wireless communication device 700 can be used in different sized ears.

In this illustrative embodiment, the upper surface 706 of the wireless communication device 700 defines a user interface actuator 707 disposed along the upper housing 701. As used herein, a "user interface actuator" is a user interface element that can be actuated by a user to cause one or more control circuits of the wireless communication device 700 to perform an action. Examples of user interface actuators include push buttons, slider switches, touch pads, rocker switches, or other devices. Other examples of user interface actuators include user actuation targets presented as virtual keys on a touch sensitive display. Still others can comprise voice commands delivered to a voice control interface.

In the illustrative embodiment of FIG. 7, the user interface actuator 707 is defined by a capacitive touchpad formed by a flexible circuit substrate being placed beneath the upper surface 706 of the upper housing 701. The flexible circuit substrate, defined in more detail below with reference to FIG. 8, includes a plurality of electrical conductors that define one or more electric field lines. When a user places a finger along the upper surface 706 of the upper housing, these electrical field lines change, thereby actuating the user interface actuator 707.

Figure 8:
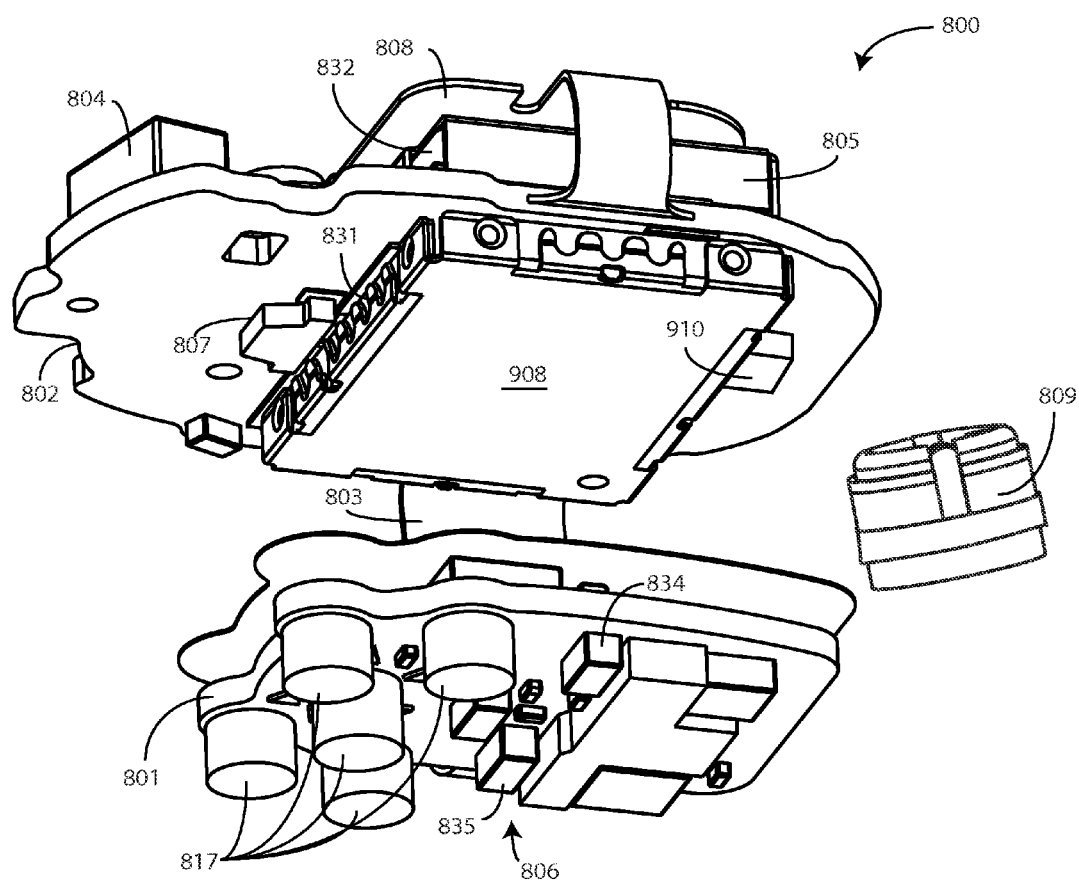
FIG. 8 illustrates explanatory electronic circuit components for a wireless communication device in accordance with one or more embodiments of the disclosure.

Turning now to FIG. 8, illustrated therein is a circuit assembly 800 suitable for use in the wireless communication device (700) of FIG. 7. The circuit assembly 800 of FIG. 8 is only an explanatory circuit assembly used to illustrate examples of location detecting and communication components suitable for use with embodiments of the disclosure. Those of ordinary skill in the art having the benefit of this disclosure will readily understand that circuit assemblies can be configured in any number of ways. Moreover, location detecting and other components can be substituted. For example, while an optical communication node will be used as one explanatory location detector, others such as Hall effect sensors, wireless communication deices, radio frequency identification devices, surface acoustic wave devices, or electrical terminals can be substituted for the optical communication node to perform substantially the same function.

This illustrative circuit assembly 800 includes a first circuit board 801 and a second circuit board 802. In one embodiment, each of the first circuit board 801 and the second circuit board 802 is manufactured from multiple layers. Some layers can be selectively placed conductive metal, such as copper or aluminum, while other layers can be insulative. Insulative layers can be manufactured from fiberglass, FR4, or other materials. In one or more embodiments, each of the first circuit board 801 and the second circuit board 802 comprises a fiberglass printed circuit board. In another embodiment, each of the first circuit board 801 and the second circuit board 802 is a FR4 printed circuit board.

In this illustrative embodiment, a first flexible substrate 803 is interposed between, and is continuous with, the first circuit board 801 and the second circuit board 802. The first flexible substrate 803 can be manufactured as a continuous component of the circuit assembly 800 in a variety of ways. Illustrating by example, in one embodiment the first circuit board 801 and the second circuit board 802 can be manufactured as a single, contiguous, unitary circuit board. The conductive and insulative layers of the single, contiguous, unitary circuit board can then be selectively removed along the first flexible substrate 803 until only a single layer of conductive metal from one of the internal layers remains. Insulative material, such as insulative tape, can then be placed about the single layer of conductive metal to form the first flexible substrate 803.

Making the first flexible substrate 803 continuous with the first circuit board 801 and the second circuit board 802 eliminates the need for connectors to be disposed along each of the first circuit board 801 and the second circuit board 802 for connection to an intermediate flexible substrate. This results in more surface area along each of the first circuit board 801 and the second circuit board 802 for electronic components. This elimination of the need for connectors also reduces the overall "stack-up" height of the circuit assembly 800. The inclusion of the first flexible substrate 803 as a continuous element between the first circuit board 801 and the second circuit board 802 also advantageously allows the circuit assembly 800 to fold or otherwise be wrapped around components. For example, the first circuit board 801, the second circuit board 802, and the first flexible substrate 803 can be wrapped about a rechargeable battery.

In this illustrative embodiment, the circuit assembly 800 also includes a second flexible substrate 808. In one embodiment, as was the case with the first flexible substrate 803, the second flexible substrate 808 is continuous with a printed circuit board in that the second flexible substrate 808 extends from, and is continuous with, the second circuit board 802. In the illustrative embodiment of FIG. 8, the second flexible substrate 808 is folded back over the second circuit board 802. Advantageously, in one or more embodiments the second flexible substrate 808 can be used as a touch sensor beneath the upper surface (706) of the upper housing (701) of a wireless communication device (700) when the wireless communication device (700) is disposed within a user's ear.

By placing the second flexible substrate 808 just beneath the upper surface (706) of the upper housing (701) of the wireless communication device (700), in one embodiment a user interface actuator (707) in the form of a touch sensitive surface may be created along the upper surface (706). The user can then control the device by interfacing with the touch sensitive surface, thereby eliminating the need for buttons or other controls that, when actuated, may move the wireless communication device (700) within the user's ear.

The second flexible substrate 808 can define a touch sensor in one of a variety of ways. In one or more embodiments, the second flexible substrate 808 defines a capacitive touch-sensing user interface actuator. The capacitive touch-sensitive user interface actuator can be configured to detect movement of, for example, a user's finger, occurring within a region defined by, for example, the outer perimeter of the second flexible substrate 808. In one embodiment, the second flexible substrate 808 can comprise a first conductor or a first plurality of conductors and a second conductor or second plurality of conductors. These conductors can then cross over each other to define a grid of pixels (where only two conductors are used the second flexible substrate 808 will define a single, large pixel forming a grid of one pixel). One conductor or set of conductors can be coupled to a touch driver, operable with a control circuit, which delivers a signal to each pixel of the grid. Electrical charges then travel to the pixel(s) of the grid. Electromagnetic fields are then created about the pixel(s). The fields are altered by interaction of a user's finger or other conductive object interacting with the second flexible substrate 708. This alteration allows the control circuit to detect touch input.

In one embodiment, where multiple pixels are used, the electrodes defining each pixel along the second flexible substrate 808 can define a coordinate plane. Said differently, each pixel can correspond to a different a particular geographic coordinate along the second flexible substrate 808. By detecting a change in the capacitance of one or more pixels, the control circuit can thus determine an X and Y coordinate at which the touch input occurs. This locational information can be used to control data the device, such as to deliver volume up or volume down information. Other forms of touch-sensitive surfaces disposed along the second flexible substrate 808 for use with embodiments of the disclosure will be obvious to those of ordinary skill in the art having the benefit of this disclosure.

While a capacitive touchpad is one technology suitable for use as a user interface actuator (707), those of ordinary skill in the art having the benefit of this disclosure will understand that other technologies can be used to define the user interface actuator (707) as well. As noted above, push buttons, slider switches, touch pads, rocker switches, or other devices can alternatively be used as the user interface actuator (707). Still other examples of user interface actuators include user actuation targets presented as virtual keys on a touch sensitive display or voice commands delivered to a voice control interface.

Where the second flexible substrate 808 is used to define the user interface actuator (707), capacitive technologies are but one way to detect user actuation. The second flexible substrate 808 could alternatively detect user actuation using a surface acoustic wave touch sensor, a surface capacitance sensor, a projected capacitance sensor, a mutual capacitance sensor, a self-capacitance sensor, an infrared grid sensor, an infrared acrylic projection sensor, an optical imaging sensor, a dispersive signal sensor, an acoustic pulse recognition sensor, and so forth.

A plurality of electrical components can be disposed on one or more of first circuit board 801, the second circuit board 802, or combinations thereof. In one embodiment, these electrical components can include one or more control circuits 831. The one or more control circuits 831 can include one or more processors, such as an application processor and, optionally, one or more auxiliary processors. One or both of the application processor or the auxiliary processor(s) can be a microprocessor, a group of processing components, one or more Application Specific Integrated Circuits (ASICs), programmable logic, or other type of processing device. The application processor and the auxiliary processor(s) can be operable with the various components disposed along the first circuit board 801, the second circuit board 802, or combinations thereof. For example, the one or more control circuits 831 can be operable with the acoustic driver 809, one or more microphones, the second flexible substrate 808 when configured as a capacitive touch sensor, and so forth. In one embodiment, the acoustic driver 809 comprises a balanced armature speaker. The acoustic driver 809 is a speaker in one embodiment that will serve as the acoustic output of an electronic device that delivers sound to a user's eardrum.

When single-channel audio information (110) or multi-channel audio information (111) is operatively received by a wireless communication circuit 832, the one or more control circuits 831 can deliver it to the acoustic driver 809 to make it audible to a user. Where the wireless communication device 700 is an ear bud designed to fit within the user's ear canal, the acoustic driver 809 may be greatly reduced in size.

In one embodiment, the one or more control circuits 831 can be configured to process and execute executable software code to perform the various functions of the wireless communication device (700) into which the printed circuit board assembly is disposed. One of the electronic components can comprise a storage device, such as memory. The memory can optionally store the executable software code used by the one or more control circuits 831 during operation. The program instructions may alternatively be stored on-board the one or more control circuits 831. The memory devices may include either or both static and dynamic memory components, may be used for storing embedded code.

In this illustrative embodiment, one electrical component comprises a wireless communication circuit 832 configured for wireless communication with one or more other devices or networks. The chip antenna 804 of the wireless communication circuit 832 is shown in this embodiment, as the other wireless communication circuitry is disposed beneath electromagnetic shield 805. The networks can include a local area network and/or personal area network. The communication circuit may utilize wireless technology for communication, such as, but are not limited to, peer-to-peer or ad hoc communications such as HomeRF, Bluetooth™, and IEEE 802.11 (a, b, g or n). The wireless communication circuit 832 can include wireless communication circuitry, one of a receiver, a transmitter, or transceiver, and one or more antennas.

In one embodiment, the one or more electronic components can comprise an optical communication node 806. For example, in this embodiment, the optical communication node 806 comprises infrared transceivers 834,235. When the circuit assembly 800 is disposed in a wireless communication device (700), in one embodiment the lower housing (702) includes a window proximately located adjacent to the infrared transceivers 834,835, as will be shown in more detail with reference to FIG. 10 below. The infrared transceivers 834,835 can use a signal emitter that transmits a beam of infrared (IR) light, and then computes the distance to any nearby objects from characteristics of the returned, reflected signal. The returned signal may be detected using a signal receiver, such as an IR photodiode to detect reflected light emitting diode (LED) light, responding to modulated IR signals, and/or triangulation. When the wireless communication device (700) is placed within an ear, the infrared transceivers 834,835 can detect this placement. The one or more control circuits 831 can use this detected infrared reflection to active the remaining electrical components. Other proximity sensor components can be substituted for the infrared sensors, such as but not limited to, capacitive, magnetic, inductive, optical/photoelectric, laser, acoustic/sonic, radar-based, Doppler-based, thermal, and radiation-based proximity sensors.

In one embodiment, a rechargeable battery powers the various electronic components. Electrical contacts 817 can be included for charging the battery. In this illustrative embodiment, the electrical contacts 817 are disposed along a bottom major face of the first circuit board 801. In one or more embodiments, the electrical contacts 817 can also be used for programming the one or more electrical circuits comprising electronic components as well. For example, one or more of the electrical contacts 817 can be used to deliver firmware updates to the one or more control circuits 831 and so forth.

One or more output devices can also be attached to the circuit assembly 800 for use as indicators. For example, in this embodiment, a light emitting diode 807 is disposed along the second major face of the second circuit board 802. When the circuit assembly 800 is disposed in a wireless communication device (700), and the lower housing (702) includes a window proximately located with the light emitting diode 807, it can project light through the window to provide device status to a user.

Illustrating by example, during a pairing process the light emitting diode 807 can present a first indication before the pairing the wireless communication device (700) to another wireless communication device. The first indication might comprise a blinking luminous output that occurs when the light emitting diode 807 blinks. Additionally, the light emitting diode 807 might present a second indication after the pairing the wireless communication device (700) to another wireless communication device. One example of the second indication would be a continuous luminous output that occurs when the light emitting diode 807 is illuminated continuously for a period of time. Other indications, such as audio outputs, tactile outputs, and so forth, provided by other output devices, will be obvious to those of ordinary skill in the art having the benefit of this disclosure.

Figure 9:
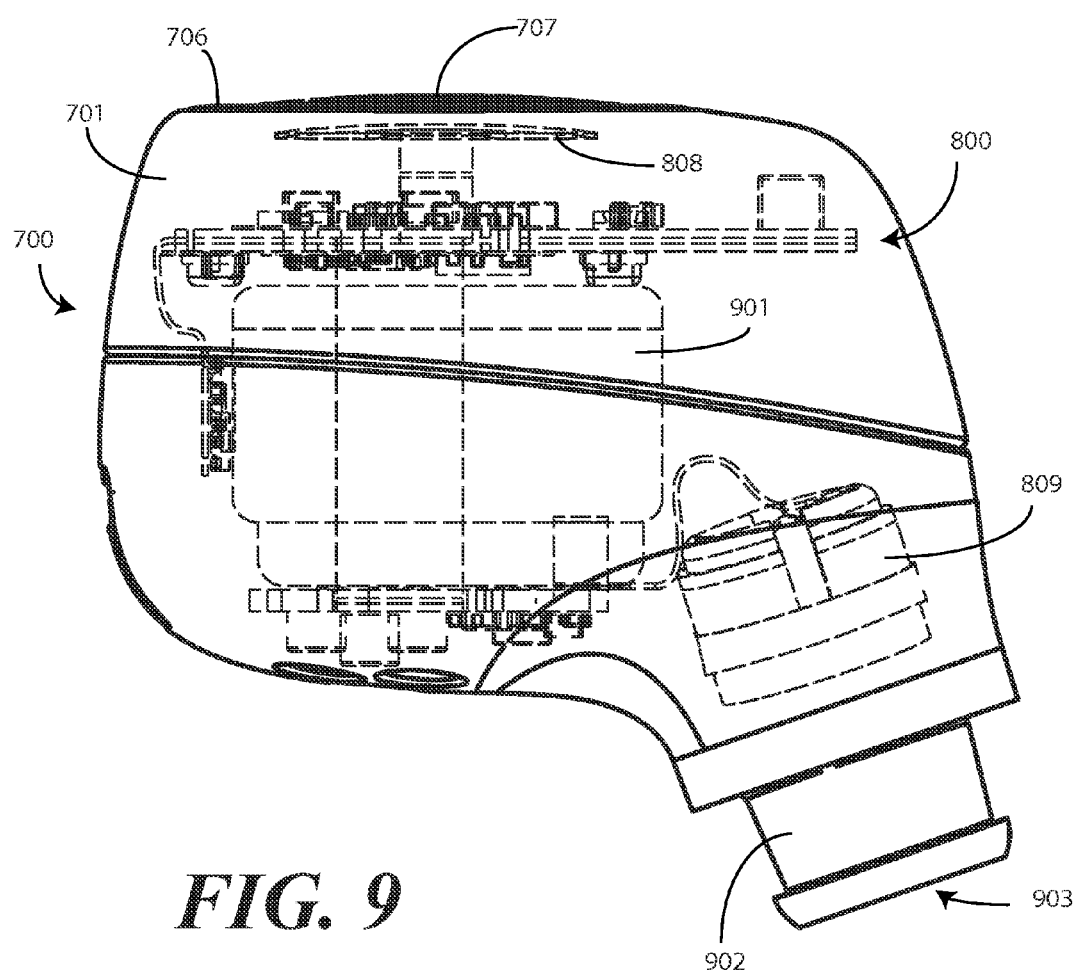
FIG. 9 illustrates another explanatory wireless communication device in accordance with one or more embodiments of the disclosure.

Turning now to FIG. 9, illustrated therein is a side view of the wireless communication device 700 with the circuit assembly 800 disposed therein. The upper housing 701 is coupled to the lower housing 702. Additionally, the cushion element (705) of FIG. 7 has been removed to reveal an ear insertion stem 902. The acoustic driver 809 is electrically coupled to the circuit assembly 800 by a pair of wire leads. The circuit assembly 800 is folded to form a "C" shape about a rechargeable battery 901. As described above, the second flexible substrate 208 of the circuit assembly 800 is folded back over the second circuit board 802 so as to be used as a user interface actuator 707 defined by a touch sensor disposed just beneath the upper surface 706 of the upper housing 701.

Figure 10:
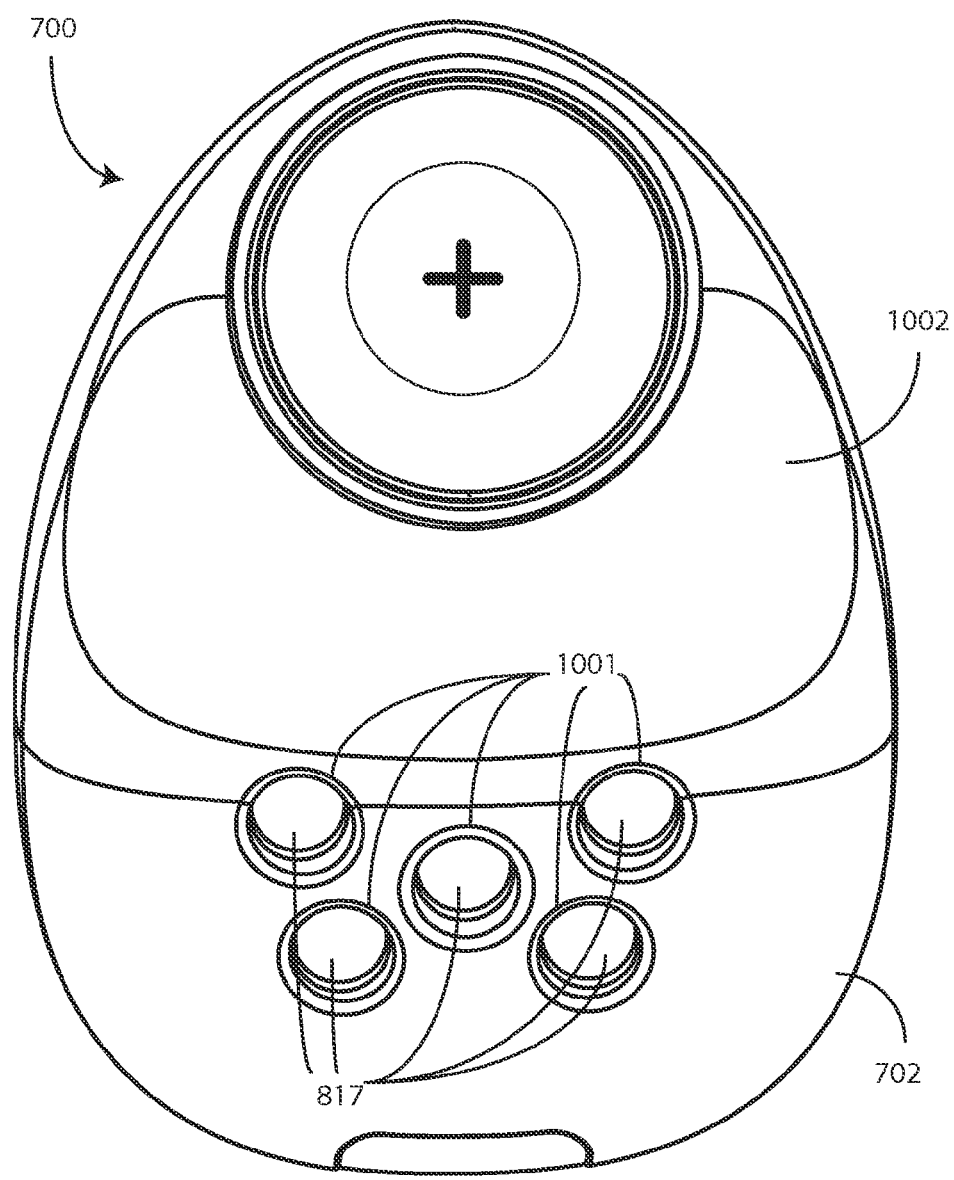
FIG. 10 illustrates an explanatory housing of a wireless communication device in accordance with one or more embodiments of the disclosure.

Turning now to FIG. 10, illustrated therein is a bottom plan view of the lower housing 702 of the wireless communication device 700. As shown in FIG. 10, the one or more electrical contacts 817 are exposed through complementary apertures 1001 of the lower housing 702 to permit charging of the rechargeable battery (901) and, optionally, programming of the one or more control circuits 831 or other processors of the wireless communication device 700.

An infrared window 1002 is disposed along the bottom of the lower housing 702. Recall from above that in one embodiment the one or more electronic components of the circuit assembly (800) can include an optical communication node (806) defined by one or more infrared transceivers (834,835). When the circuit assembly (800) is disposed in the lower housing 702, the infrared window 1002 is proximately located with the infrared transceivers (834,835). Accordingly, the infrared transceivers (834,835) can use a signal emitter that transmits a beam of infrared (IR) light through the infrared window 1002 to, for example, compute the distance to any nearby objects from characteristics of the returned, reflected signal. The one or more control circuits (831) can then determine that the wireless communication device 700 is disposed in a user's ear when the returned, reflected signal saturates. Alternatively, as will be described below, the one or more control circuits (831) can cause the wireless communication circuit (832) to enter a searching pairing mode of operation when the wireless communication device 700 is disposed within a wireless communication device accessory. In one embodiment, the infrared window 1002 is part of the lower housing 702. In one embodiment the infrared window 1002 is manufactured from a clear material, such as a clear thermoplastic.

Figure 11:
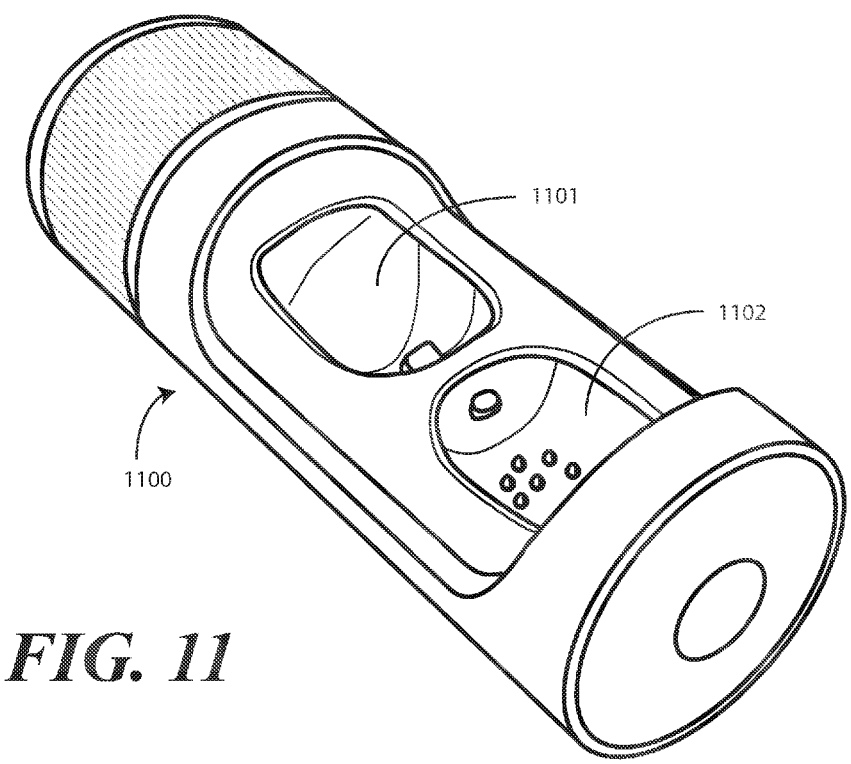
FIG. 11 illustrates a perspective view of one explanatory wireless communication device accessory in accordance with one or more embodiment of the disclosure.

Turning now to FIG. 11, illustrated therein is one explanatory wireless communication device accessory 1100 in accordance with one or more embodiments of the disclosure. The explanatory wireless communication device accessory 1100 of FIG. 11 is shown as a charger for the wireless communication device (700) of FIGS. 7, 9, and 10. However, the wireless communication device accessory 1100 could take other forms as well. For example, the wireless communication device accessory 1100 may comprise a case for the wireless communication device (700), a docking station, or other form. Still other examples of wireless communication device accessories will be obvious to those of ordinary skill in the art having the benefit of this disclosure.

In the illustrative embodiment of FIG. 11, the wireless communication device accessory 1100 comprises a first receiver 1101 to receive a first wireless communication device and a second receiver 1102 to receive a second wireless communication device. In this illustrative embodiment, the first receiver 1101 comprises a first pocket to receive a first wireless ear bud, while the second receiver 1102 comprises a second pocket to receive a second wireless ear bud.

Figure 12:
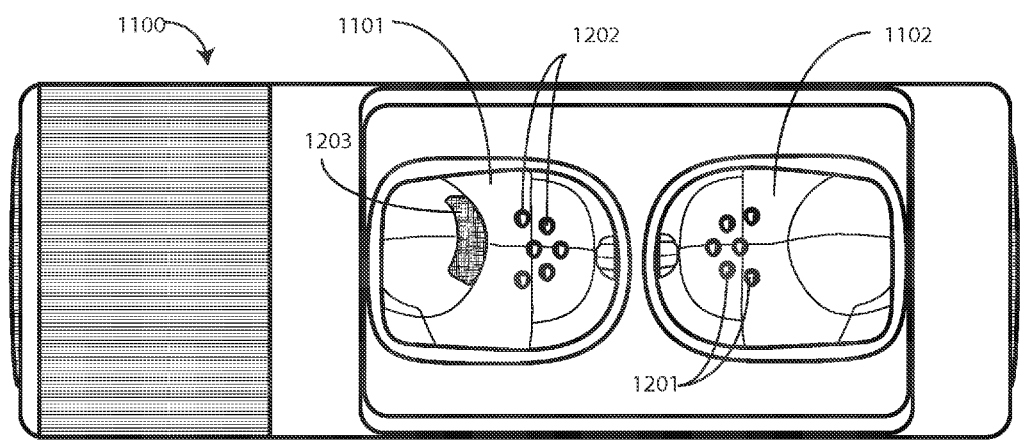
FIG. 12 illustrates a top plan view of one explanatory wireless communication device accessory in accordance with one or more embodiment of the disclosure.

Turning to FIG. 12, the first receiver 1101 and the second receiver 1102 are shown in plan view. Since the wireless communication device accessory 1100 is a charger, in one embodiment each of the first receiver 1101 and the second receiver comprises electrical contacts 1201,1202 to couple to the one or more electrical contacts (817) of a wireless ear bud that are exposed through complementary apertures (1001) of a lower housing (702). In one embodiment, the electrical contacts 1201,1202 deliver current to the electrical contacts (817) of the wireless ear bud to permit charging of a rechargeable battery (901). The electrical contacts 1201, 1202 can optionally deliver data to program one or more control circuits (831) or other processors of an ear bud as previously described.

In one embodiment, one of the first receiver 1101 or the second receiver 1102 includes a definition device to indicate to a wireless communication device (700) inserted into the receiver that it is a special type of receiver. The definition device can take various different forms. In the illustrative embodiment of FIG. 11, the definition device comprises a reflective surface 1203. Recall from above that in one embodiment an infrared window (1002) is disposed along the bottom of a lower housing (702) of a wireless communication device (700). Infrared transceivers (834,835) can use a signal emitter that transmits a beam of infrared (IR) light through the infrared window (1002). In one embodiment, the reflective surface 1203 is to reflect these optical communication signals back to optical communication node (806) of a wireless communication device (700) when the wireless communication device (700) is disposed within the first receiver 1101. This allows the optical communication node (806) to function as a location detector to determine whether the wireless communication device (700) is disposed at a predefined location. Where the reflective signals are received, the one or more control circuits (831) can conclude that the wireless communication device (700) is disposed at a predefined location. By contrast, when no reflected signals are received, the one or more control circuits (831) can conclude that the wireless communication device (700) is not disposed at the predefined location.

When used in conjunction with actuation of a user interface actuator (707), these reflections can indicate that the one or more control circuits (831) should change a mode of operation. For example, the reflective surface 1203 can reflect infrared signals emitted by the optical communication node (806) of a wireless communication device to cause the one or more control circuits (831) to cause the wireless communication circuit (832) to enter a searching pairing mode of operation.

While a reflective surface 1203, operable with an optical communication node (806), is one example of an identification device, embodiments of the disclosure are not so limited. Other identification devices that allow the one or more control circuits (831) of a wireless communication device (700) to determine whether it is in a predefined location can include Hall effect sensors, wireless communication deices, radio frequency identification devices, surface acoustic wave devices, or electrical terminals. Still others will be obvious to those of ordinary skill in the art having the benefit of this disclosure.

Figure 13:
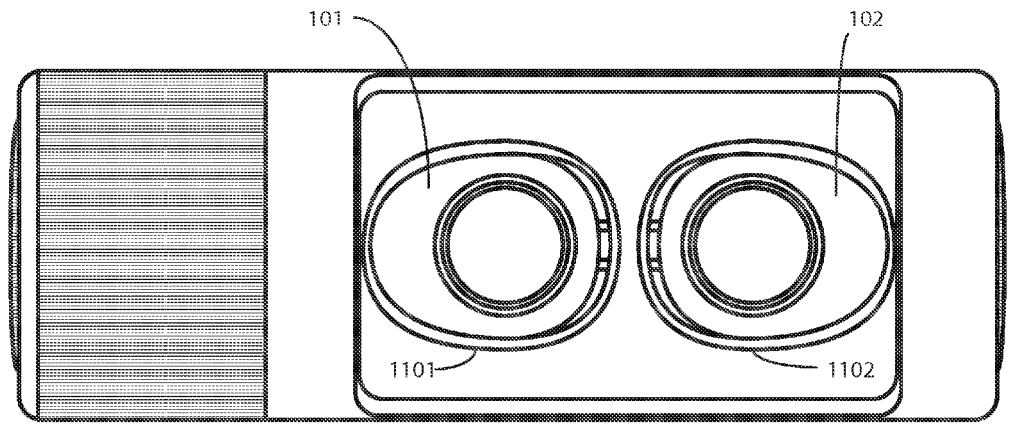
FIG. 13 illustrates two explanatory wireless communication devices disposed in receivers of one explanatory wireless communication device accessory in accordance with one or more embodiment of the disclosure.
Figure 14:
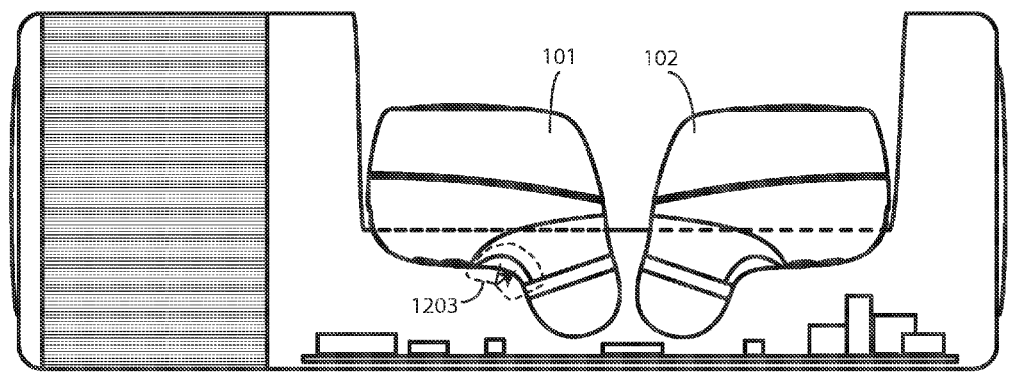
FIG. 14 illustrates a sectional view of two explanatory wireless communication devices disposed in receivers of one explanatory wireless communication device accessory in accordance with one or more embodiment of the disclosure.

Turning to FIG. 13, a first wireless communication device 101 and a second wireless communication device 102 have been disposed within the first receiver 1101 and the second receiver 1102, respectively. As shown in FIG. 12, the first wireless communication device 101 is in the pocket with the reflective surface 1203, while the second wireless communication device 102 is in a pocket with no reflective surface. Accordingly, when the infrared signal emitters of the optical communication node (806) emit infrared signals, these signals will be reflected from the reflective surface 1203 to the infrared receivers of the optical communication node (806), thereby causing the infrared receivers to saturate. In one or more embodiments, this reflection will be used to adjust the mode of operation in accordance with the methods described below with reference to FIG. 9. In one or more embodiments, this reflection will also be used to determine which wireless communication device initially operates, or operates in an initial mode, as the dominant, master device and which operates as the subdominant, slave device.

Figure 15:
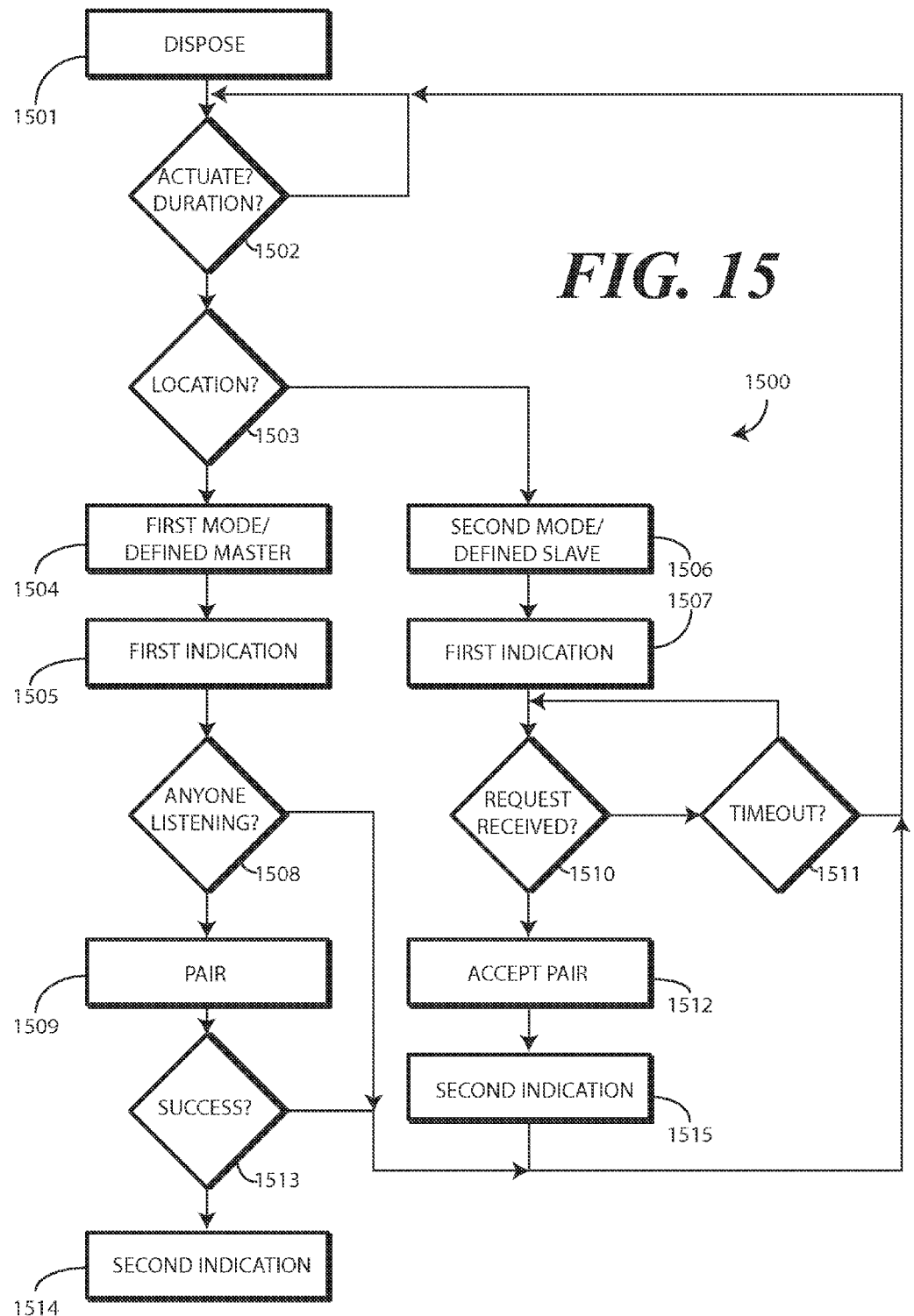
FIG. 15 illustrates one explanatory method in accordance with one or more embodiments of the disclosure.
Figure 16:
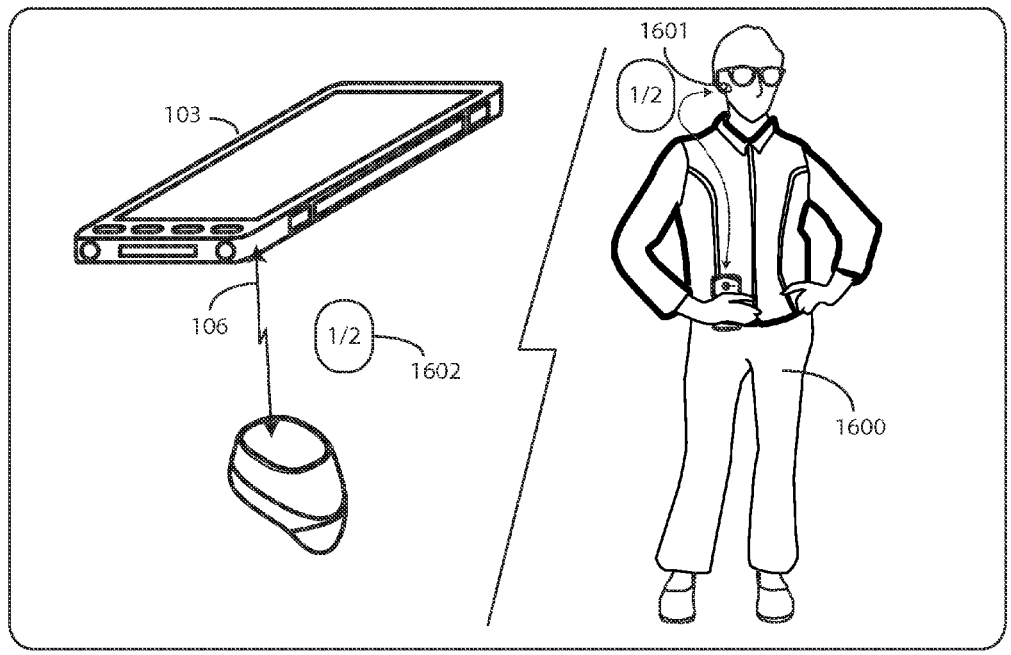
FIG. 16 illustrates a user using a single wireless communication device to listen to multi-channel audio information in accordance with one or more embodiments of the disclosure.

Turning to FIG. 15, illustrated therein is a method 1500 for a wireless communication device (700) that enables pairing to another wireless communication device with a simple actuation of a user interface actuator (707). The method 1500 also enables identifying, with one or more control circuits (831), that a wireless communication device is, in an initial state, to operate as a master device to another paired wireless communication device, or alternatively to initially operate as a slave device to the other paired wireless communication device.

The method 1500 generally includes the following steps: detecting, with one or more control circuits (831) operable with a user interface actuator (707), actuation of the user interface actuator for at least a predetermined duration; and determining, with the one or more control circuits, whether the wireless communication device is disposed at a first predefined location or a second predefined location, e.g., the first receiver (1101) or the second receiver (1102) of wireless communication device accessory (1100). In one embodiment this is determined by identifying whether the optical communication node (806) receives reflected signals from the reflective surface (1203) of the first receiver (1101). Where the wireless communication device is disposed at the first predefined location, the method 1500 includes causing, with the one or more control circuits, a wireless communication circuit (832) to enter a first mode of operation. In one embodiment, the first mode of operation is a searching pairing mode of operation. In one embodiment, where the wireless communication device is disposed at the predefined location, the method 1500 also includes identifying, with one or more control circuits (831), that the wireless communication device is, in an initial state, to operate as a master device another paired wireless communication device.

Alternatively, where the wireless communication device is disposed at the second predefined location, the method 1500 includes causing, with the one or more control circuits, the wireless communication circuit to enter a second mode of operation. In one embodiment the second mode of operation is a listening pairing mode of operation. In one embodiment, where the wireless communication device is disposed at the second predefined location, the method 1500 also includes identifying, with the one or more control circuits (831), that the wireless communication device is, in an initial state, to operate as a slave device to another paired wireless communication device. While additional details are provided in the various steps of FIG. 15, these details are explanatory only. Other ways of implementing the basic steps of this paragraph will be obvious to those of ordinary skill in the art having the benefit of this disclosure.

Beginning at step 1501, the method includes placing a first wireless communication device (101) and a second wireless communication device (102) within the first receiver (1101) and the second receiver (1102), respectively, of a wireless communication device accessory (1100). Step 1501 can also include actuating a user interface actuator (707). For example, where the user interface actuator (707) comprises a touch sensitive surface along an upper surface (706) of an upper housing (701), actuation could comprise a user placing a finger adjacent to the upper surface (706) of the upper housing (701).

At decision 1502, the method 1500 determines whether the actuation of the user interface actuator (707) at step 1501 occurred for at least a predetermined duration. The predetermined duration can vary. In one embodiment, the predetermined duration is at least two seconds. In another embodiment, the predetermined duration is at least six seconds. In another embodiment, the predetermined duration is at least ten seconds. Other predetermined durations will be obvious to those of ordinary skill in the art having the benefit of this disclosure. Where, for example, the predetermined duration is six seconds, decision 1502 will be affirmative when the user places a finger adjacent to the upper surface (706) of the upper housing (701) for at least six seconds.

At decision 1503, the method 1500 determines determining, with the one or more control circuits, whether each wireless communication device is disposed at a first predefined location or a second predefined location. For example, at decision 1503 the method 1500 determines whether the first wireless communication device (101) or the second wireless communication device (102) is disposed within the first receiver (1101). In one embodiment, one or more control circuits (831) make this determination by identifying whether an optical communication node (806) receives reflections of signals emitted by the optical communication node. If the first wireless communication device (101) and the second wireless communication device (102) are disposed within the first receiver (1101) and the second receiver (1102), respectively, of a wireless communication device accessory (1100), and the first receiver includes a reflective surface (1203), the one or more control circuits (831) can determine whether reflections are reflected from the reflective surface (1203) disposed along the first receiver (1101) of the wireless communication device accessory (1100).

At step 1504, where the wireless communication device is disposed at the first predefined location, the method 1500 includes causing, with the one or more control circuits, the wireless communication circuit (832) to enter a first mode of operation. In one embodiment, the first mode of operation comprises a searching pairing mode of operation. In one embodiment, this comprises transmitting an identification request to search for devices. Illustrating by example, if first wireless communication device (101) is disposed within the first receiver (1101) of the wireless communication device accessory (1100), its optical communication node (1106) will receive reflections from the reflective surface (1203). Accordingly, its control circuit (831) will cause the wireless communication circuit (832) to enter the searching pairing mode of operation at step 1504. In one embodiment, the searching pairing mode of operation is invoked for only a limited time, such as between fifteen and thirty seconds, inclusive. The first wireless communication device (101) can thus send one or more identification requests to nearby devices.

In one embodiment at step 1504, where the wireless communication device is disposed at the first predefined location, the method 1500 also includes identifying, with the one or more control circuits (831), that the wireless communication device is, in an initial state, to operate as a master device to another paired wireless communication device. Thus, if the first wireless communication device (101) is disposed in the first receiver (1101), it will be the master to the second wireless communication device (102) disposed in the second receiver (1102) because it receives reflections are reflected from the reflective surface (1203) disposed along the first receiver (1101) of the wireless communication device accessory (1100).

At step 1505, the method 1500 can include presenting, with an output device, a first indication after causing the wireless communication circuit to enter the searching pairing mode of operation at step 1504. In one embodiment, presentation of the first indication at step 1505 occurs before the pairing the first wireless communication device (101) to another wireless communication device. In one embodiment, the first indication comprises a blinking luminous output. For example, the light emitting diode (807) can blink green to let the user known that a paring process has been invoked. Other indications can include sounds, haptic outputs, and so forth.

By contrast, at step 1506, where the wireless communication device is disposed at the second predefined location, the method 1500 include causing, with the one or more control circuits, the wireless communication circuit to enter a second mode of operation. In one embodiment, the second mode of operation comprises a listening pairing mode of operation. Illustrating by example, if second wireless communication device (102) is disposed within the second receiver (1102) of the wireless communication device accessory (1100), its optical communication node (1106) will not receive reflections from the second receiver (1102) because it contains no reflective surface (1203). Accordingly, its control circuit (831) will cause the wireless communication circuit (832) to enter the listening pairing mode of operation at step 906. In one embodiment, the listening pairing mode of operation is invoked for only a limited time, such as between fifteen and thirty seconds, inclusive.

In one embodiment at step 1506, where the wireless communication device is disposed at the second predefined location, the method 1500 also includes identifying, with the one or more control circuits (831), that the wireless communication device is, in an initial state, to operate as a slave device to another paired wireless communication device. Thus, if the second wireless communication device (102) is disposed in the second receiver (1102), it will be the slave initially to the first wireless communication device (101) disposed in the first receiver (1101) because it will not receive reflections from the second receiver (1102) because it contains no reflective surface (1203). At step 1507, the method 1500 can include presenting, with an output device, a first indication after causing the wireless communication circuit to enter the listening pairing mode of operation at step 1506.

At decision 1508, the wireless communication device operating in the searching pairing mode of operation determines whether any nearby wireless communication devices are operating in the listening pairing mode of operation. In one embodiment, this occurs by determining whether any responses to the identification request are received. Continuing the example from above, at decision 908 the first wireless communication device (101), being disposed within the first receiver (1101) of the wireless communication device accessory (1100) and receiving reflections from the reflective surface (1203), operates in the searching pairing mode of operation at step 1504 and sends out an identification request. Meanwhile, the second wireless communication device (102), being disposed within the second receiver (1102) of the wireless communication device accessory (1100) and not receiving reflections from the second receiver (1102) because it contains no reflective surface (1203), operates in the listening pairing mode of operation, receives the identification request, and sends an identification response. Accordingly, at decision 1508 the first wireless communication device (101) will determine that the second wireless communication device (102) is present.

When this occurs, at step 1509 the first wireless communication device (101) will execute the pairing process. In one embodiment, this comprises sending a pairing request. It is contemplated that there may be more than one wireless communication device operating in the listening pairing mode of operation. Accordingly, in one embodiment, decision 908 will involve receiving a plurality of identification responses. Where this occurs, the first wireless communication device (101) can perform one or more filtering operations at step 909. For example, the first wireless communication device (101) can filter wireless communication devices operating in the listening pairing mode of operation based on signal strength, device name, and class of device. In one or more embodiments, the pairing process executed at step 909 comprises sending a pairing request to the closest device found that is the proper class of device and that includes an expected device name. If, for example, both wireless communication devices are wireless ear buds, the class of device might be 0x240404. If both wireless communication devices are wireless ear buds manufactured by Motorola Mobility, the device name might be "Moto Verve" or another model name. These classes and names are illustrative only, as others will be obvious to those of ordinary skill in the art having the benefit of this disclosure.

Whether this pairing request is received by the second wireless communication device (102) is determined at decision 1510. If no pairing request is received for a predetermined time, as determined at decision 1511, the second wireless communication device (102) will exit the listening pairing mode of operation to prevent the receipt of pairing requests from unauthorized devices. In one embodiment, this predetermined time is about thirty seconds.

Where the second wireless communication device (102) receives the pairing request from the first wireless communication device (101), as determined at decision 1510, the second wireless communication device will accept the pair request at step 1512 and will send a pairing response to the first wireless communication device (101). The first wireless communication device (101) can determine whether the pairing was successful at decision 1513. Where it is, one or both of the first wireless communication device (101) and the second wireless communication device (102) can present, at steps 1514 and 1515, respectively, with an output device such as light emitting diode (807), a second indication after pairing to each other. In one embodiment, the second indication comprises a continuous luminous output. For example, the light emitting diode (807) may turn solid green for a predetermined time.

Now that methods, devices, and systems have been described, FIGS. 16-22 illustrate an explanatory use case to show embodiments of the disclosure in operation. Beginning with FIG. 16, a user 1600 has purchased a single wireless ear bud 1601. The single wireless ear bud 1601 establishes a wireless communication channel 106 with an audio source 103. In one embodiment, the single wireless ear bud 1601 receives stereo audio 1602 from the audio source 103. Since no peer wireless communication device is paired with the single wireless ear bud 1601, the stereo audio 1602 is delivered to the single wireless ear bud 1601 and into the user's ear as monaural sound.

Figure 17:
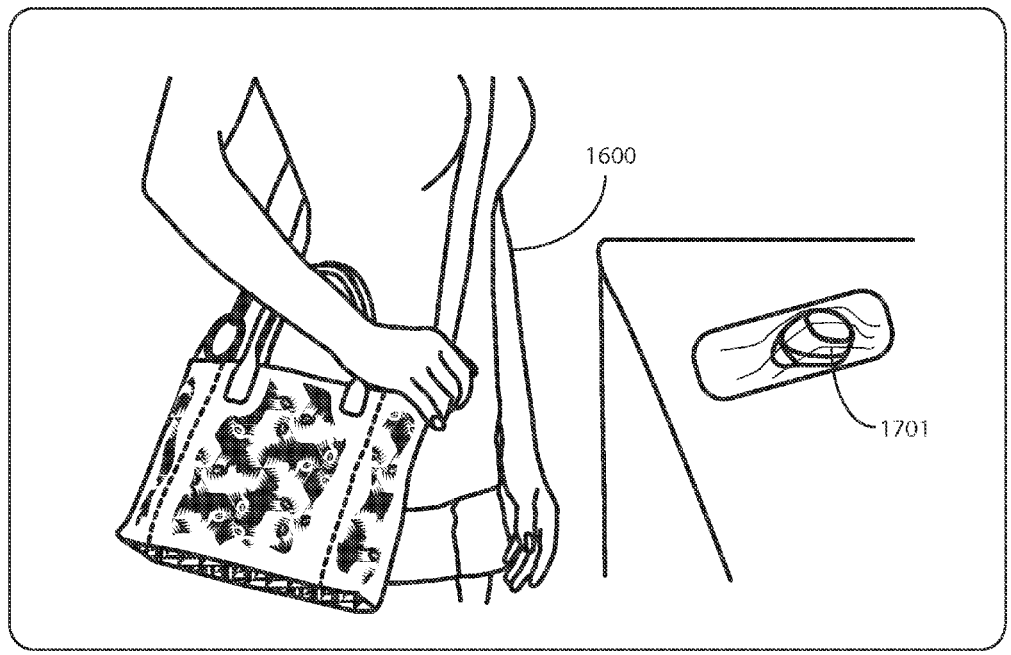
FIG. 17 illustrates the user purchasing a second wireless communication device configured in accordance with one or more embodiments of the disclosure.

Turning to FIG. 17, the user 1600 has gotten tired of monaural output and wants to dance to Henry and the Pipers in stereo. Accordingly, she goes to the store and purchases a second wireless ear bud 1701. Since the second wireless ear bud 1701 includes no information regarding the audio source (103), i.e., the user's smart phone, and also includes no information regarding the user's other ear bud, i.e., single wireless ear bud (1601), the second wireless ear bud 1701 will need to be paired to the first wireless ear bud (1601). During this pairing process, ascendency will be established with one ear bud working as the initial master and the other working as the initial slave.

Figure 18:
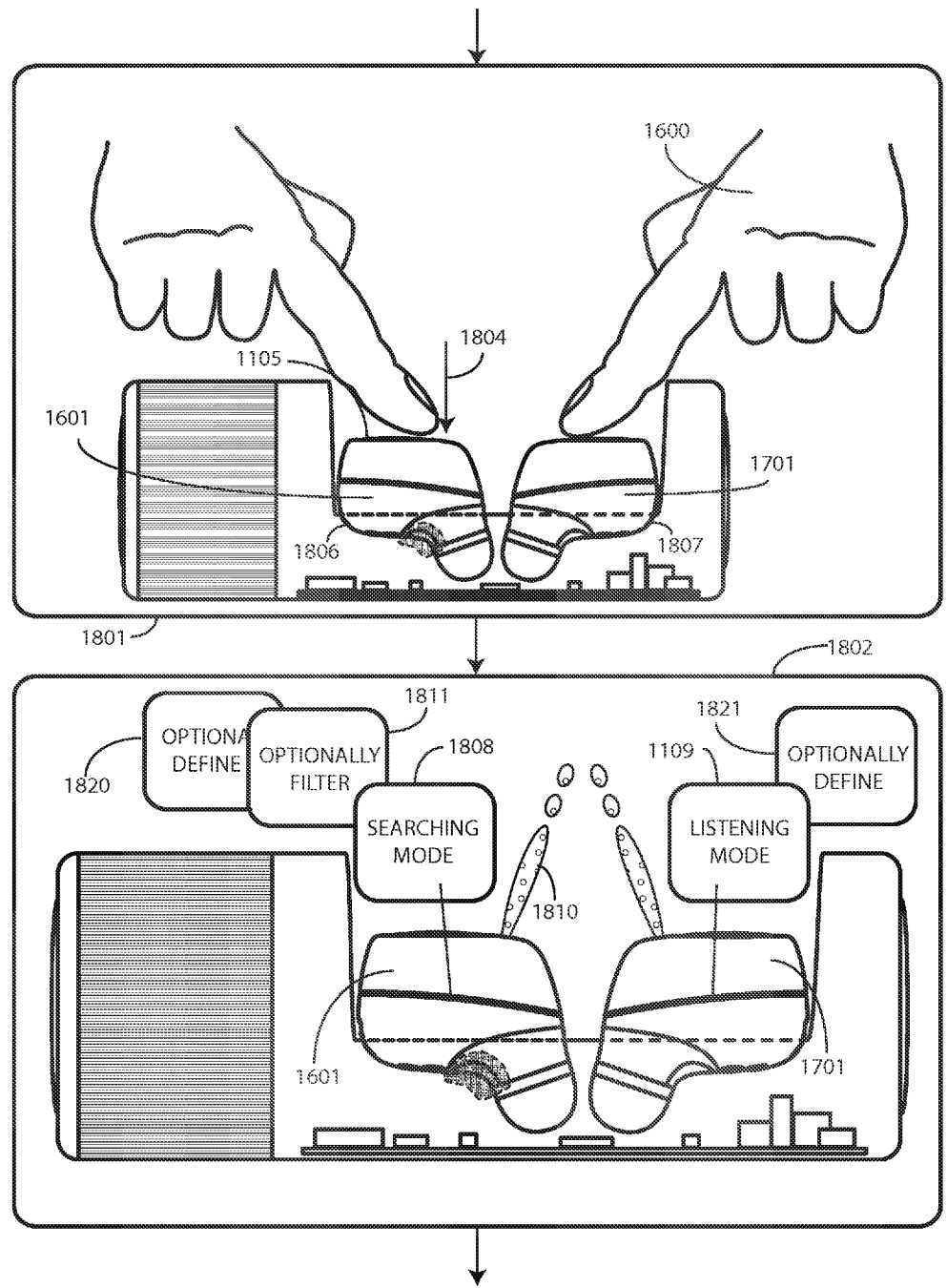
FIG. 18 illustrates one or more method steps in accordance with one or more embodiments of the disclosure.

Turning now to FIG. 18, the first wireless ear bud 1601 and a second wireless ear bud 1701 are disposed into a wireless communication device accessory 1100, which in this embodiment is a charger. In one or more embodiments, the a first wireless ear bud 1601 and a second wireless ear bud 1701 can identify, with one or more control circuits, that they are mechanically coupled to, or disposed in, the wireless communication device accessory 1100.

For example, when one or more electrical contacts are exposed through complementary apertures of the lower housing to permit charging of a rechargeable battery or, optionally, programming one or more control circuits, the fact that the first wireless ear bud 1601 or the second wireless ear bud 1701 are mechanically coupled to, or disposed in, the wireless communication device accessory 1100 can be detected when one or both of voltage or current is detected at the one or more electrical contacts are exposed through complementary apertures of the lower housing from the electrical contacts (1201) of the wireless communication device accessory 1100.

At step 1801, the user 1600 actuates 1804 a user interface actuator 1805, which in this case is a push button. One or more control circuits of the first wireless ear bud 1601 or the second wireless ear bud 1701 detect the actuation 1804 of the user interface actuator 1805.

Since the first wireless ear bud 1601 is in a predefined location, i.e., disposed within charger pocket 1806, which includes a reflective surface 1203, at step 1802 its one or more control circuits cause its wireless communication circuit to enter a first mode of operation, which in this case is the searching pairing mode of operation 1808. Similarly, since the second wireless ear bud 1701 is not in the predefined location, but is instead disposed within the second charger pocket 1807 that has no reflective surface, its one or more control circuits cause its wireless communication circuit to enter a second mode of operation. In this example, the second mode of operation is the listening pairing mode of operation 1809.

In one embodiment at step 1802, each of the first wireless ear bud 1601 and the second wireless ear bud 1701 present a first indication 1810. In one embodiment, the first indication 1810 occurs before pairing the first wireless ear bud 1601 to the second wireless ear bud 1701. In this illustrative embodiment, the first indication 1810 comprises a blinking luminous output.

In one embodiment, at step 1802 the first wireless ear bud 1601 also identifies that it is, in an initial state 1821, to operate as a master device to the second wireless ear bud 1701. Similarly, the second wireless ear bud 1701 identifies that it is, in an initial state 1822, to operate as a slave device to the first wireless ear bud 1601. Accordingly, initial ascendency has been determined. As noted above, the ascendancy can be changed, either in accordance with the methods of FIGS. 5-6, or alternatively as a function of the other factors, e.g., battery capacity or first to power ON, as previously described.

At step 1802, the first wireless ear bud 11601 can optionally perform one or more filtering operations 1811 to "weed out" listening devices based on signal strength, device name, and class of device. Once filtering operations 1811 are complete, the first wireless ear bud 1601 can now pair to the listening device that has the strongest signal strength, which implies the listening device is in closest proximity to the first wireless ear bud 11601, has the correct device name, and supports the appropriate class of device. In this example, this is the second wireless ear bud 1701.

Figure 19:
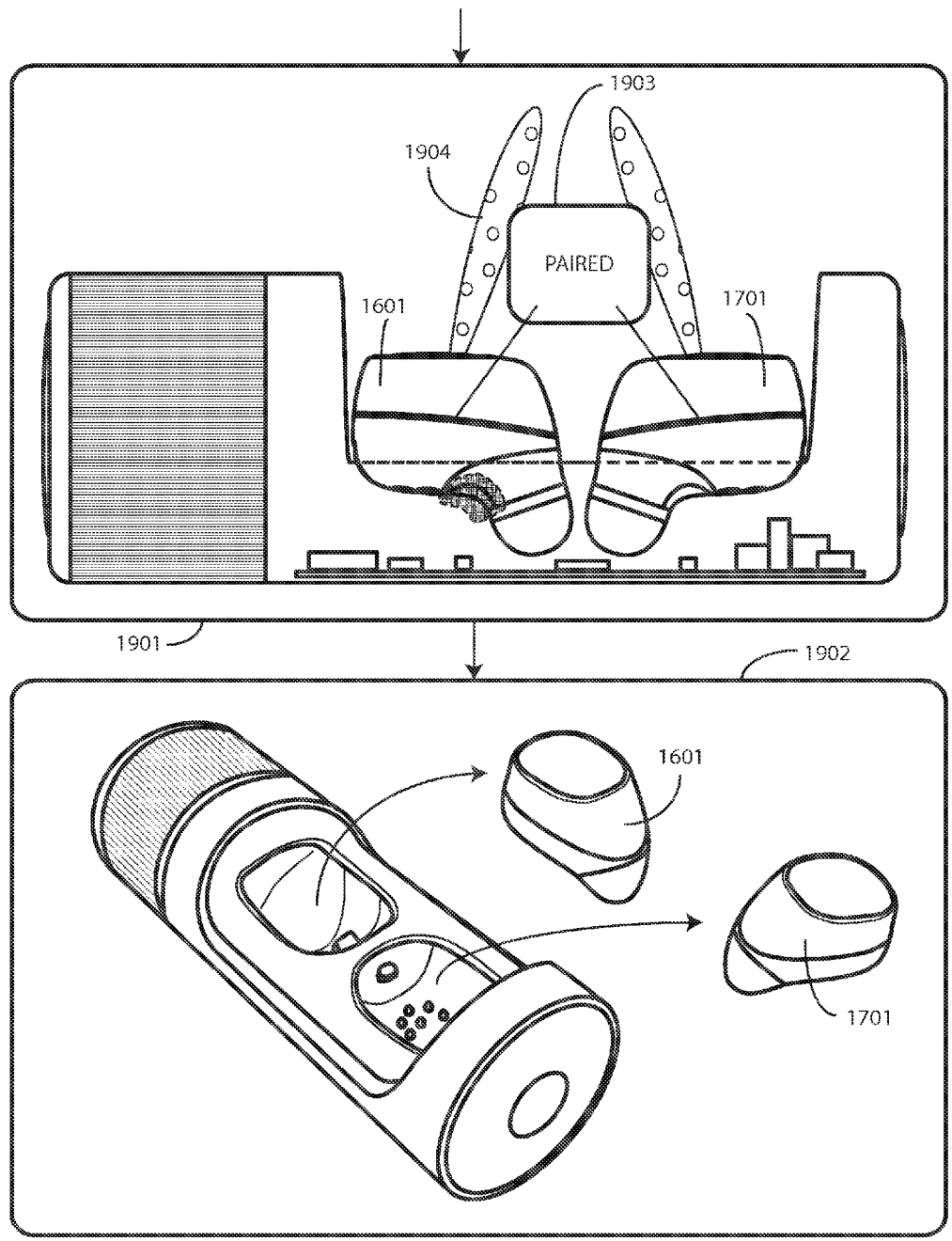
FIG. 19 illustrates one or more method steps in accordance with one or more embodiments of the disclosure.
Figure 20:
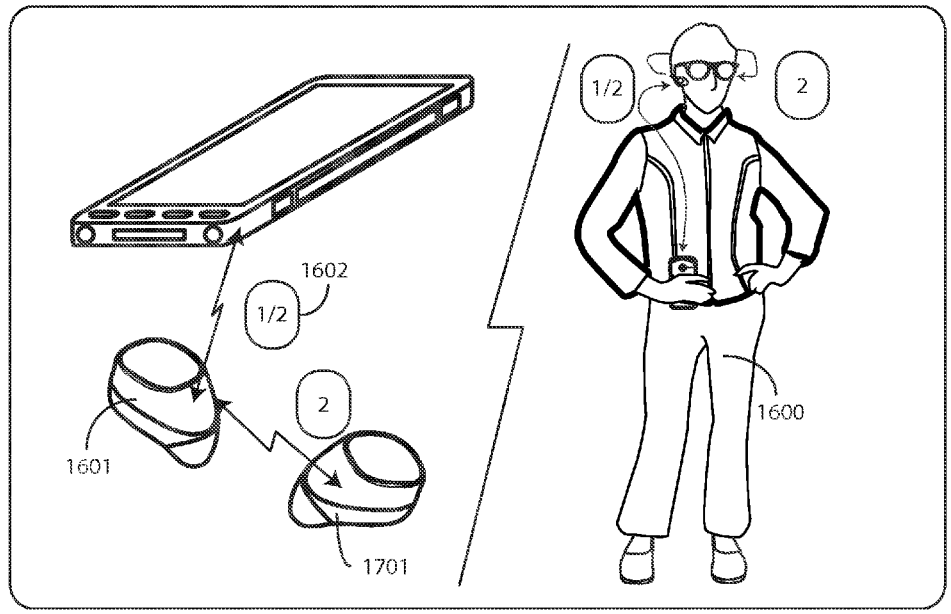
FIG. 20 illustrates a user using a pair of wireless communication devices to listen to multi-channel audio information in accordance with one or more embodiments of the disclosure.

Turning to FIG. 19, at step 1901 the pairing process 1903 is complete. In one or more embodiments, the first wireless ear bud 1601 and the second wireless ear bud 1701 can present, with an output device, a second indication 1904 after the pairing process 1903 is complete. In this example, the second indication 1904 comprises a continuous luminous output. The user (1600) thus knows that the pairing process 1903 is finished. At step 1902, the first wireless ear bud 1601 and the second wireless ear bud 1701 can be used as a tandem pair. In one embodiment, the first wireless ear bud 1601 and the second wireless ear bud 1701 are paired together as a left speaker and a right speaker to deliver stereo audio 1602 to the ears of the user 1600, as shown in FIG. 20.

Figure 21:
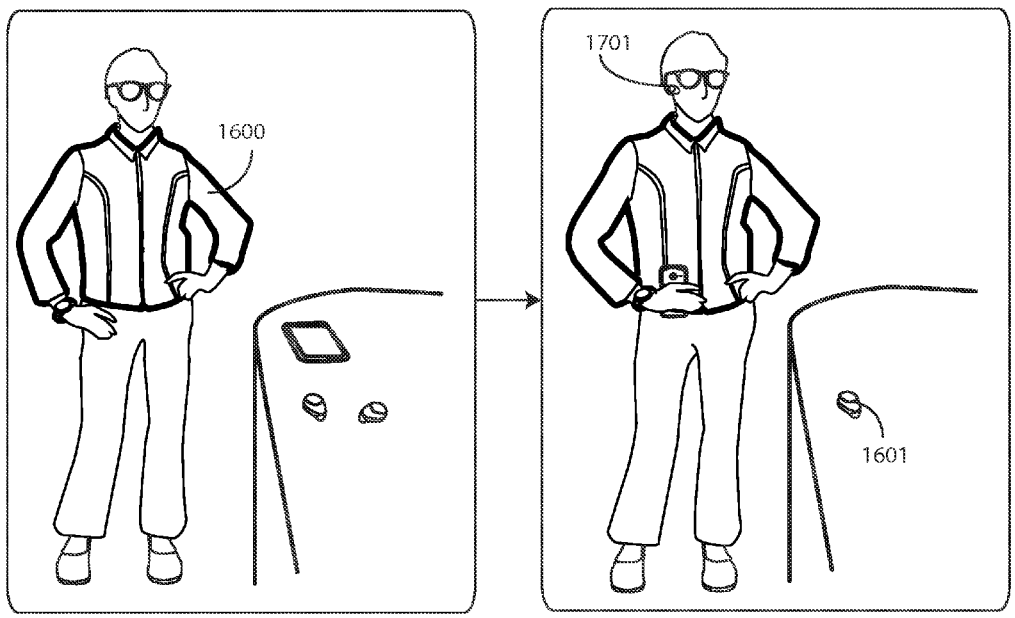
FIG. 21 illustrates one or more method steps in accordance with one or more embodiments of the disclosure.

In FIG. 21, the user 1600 is going driving. She wants to be able to hear other cars and traffic. Consequently, she only wants to use one wireless ear bud. She selects—for whatever reason—the second wireless ear bud 1701, deciding to leave the first wireless ear bud 1601, which is the master in the default state, at home.

Figure 22:
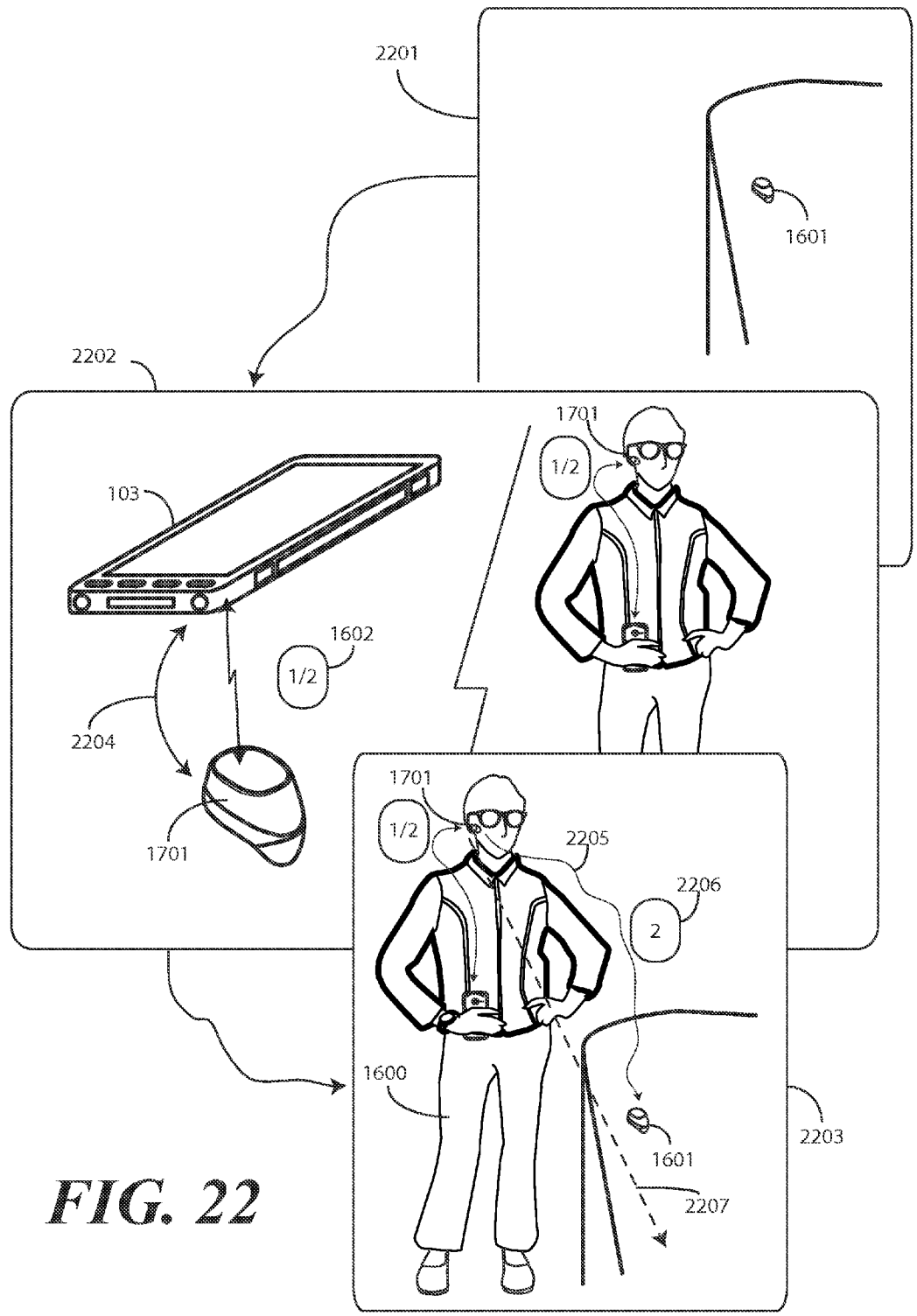
FIG. 22 illustrates one or more method steps in accordance with one or more embodiments of the disclosure.

Advantageously, using embodiments of the disclosure, as shown at FIG. 22, the second wireless ear bud 1701 executes the method of FIG. 6 upon detecting that the first wireless ear bud 1601 was left at home at step 2201 and is therefore outside a predefined communication radius. Accordingly, the second wireless ear bud 1701, at step 2202, steps in to serve as the master regardless of its prior state. Specifically, the second wireless ear bud 1701 detects that the first wireless ear bud 1601 was left at home. Accordingly, the second wireless ear bud 1701 can connect 2204, with its wireless communication circuit, to the audio source 103 using the audio source information (111) received from the first wireless ear bud 1601 in FIG. 22. The second wireless ear bud 1701 can then receive, with its wireless communication circuit, stereo audio 1602 from the audio source 103 and deliver the same into the user's ear as monaural sound.

When the user arrives at home again, as shown at step 2203, and the first wireless ear bud 1601 is within a predefined communication radius of the second wireless ear bud 1701, the second wireless ear bud 1701 can detect 2207 the first wireless ear bud 1601 reconnecting to the wireless communication circuit of the second wireless ear bud 1701. The second wireless ear bud 1701 can then deliver 2205, with the wireless communication circuit, right channel audio 2206 to the first wireless ear bud 1601 while delivering, with the one or more control circuits, the right channel to the user's ear. The user 1600 can reverse this by toggling the user interface actuator (707). The user can then listen to, nay, celebrate the library of Henry and the Pipers in full stereo.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in a wireless communication device, the method comprising:
   receiving, with a wireless communication circuit, single-channel audio information across a network from a paired wireless communication device;
   also receiving, with the wireless communication circuit, audio source information identifying a remote electronic device from which transmission of the single-channel audio information originated;
   delivering, with one or more control circuits operable with the wireless communication circuit, the single-channel audio information to an output device;
   detecting, with the one or more control circuits, the paired wireless communication device disconnecting from the wireless communication circuit;
   connecting, with the wireless communication circuit, the wireless communication device to the remote electronic device identified by the audio source information;
   receiving, with the wireless communication circuit, multi-channel audio information across the network from the remote electronic device; and
   in response to the disconnecting, delivering, with the one or more control circuits operable with the wireless communication circuit, the multi-channel audio information to the output device.

2. The method of claim 1, the multi-channel audio information comprising stereo audio information.

3. The method of claim 2, the single-channel audio information comprising a right channel of the stereo audio information.

4. The method of claim 1, further comprising:
  detecting, with the one or more control circuits, the paired wireless communication device reconnecting to the wireless communication circuit;
  delivering, with the wireless communication circuit, first single-channel audio information across the network to the paired wireless communication device; and
  delivering, with the one or more control circuits, second single-channel audio information to the output device.

5. The method of claim 1, further comprising identifying, with the one or more control circuits, that the wireless communication device is, in an initial state, to operate as a slave device to the paired wireless communication device.

6. The method of claim 5, further comprising:
  detecting, with the one or more control circuits, actuation of a user interface actuator for at least a predetermined duration; and
  determining, with the one or more control circuits, whether the wireless communication device is disposed at a first predefined location or a second predefined location; and
  the identifying occurring only where the wireless communication device is disposed at the second predefined location.

7. The method of claim 6, the identifying occurring during a pairing operation.

8. The method of claim 6, the identifying occurring when the wireless communication device is coupled to a wireless communication device accessory while an optical communication node fails to receive reflections of transmitted optical signals.

9. A method in a wireless communication device, the method comprising:
  receiving, with a wireless communication circuit, multi-channel audio information across a network from a remote electronic device;
  delivering, with the wireless communication circuit, the audio source information identifying the remote electronic device from which transmission of the multi-channel audio information originated to a paired wireless communication device;
  also delivering, with the wireless communication circuit, first single-channel audio information from the multi-channel audio information to the paired wireless communication device;
  delivering, with one or more control circuits operable with the wireless communication circuit, second single-channel audio information from the multi-channel audio information to an output device;
  detecting, with the one or more control circuits, the paired wireless communication device disconnecting from the wireless communication circuit; and
  in response to the disconnecting, delivering, with the one or more control circuits operable with the wireless communication circuit, the multi-channel audio information to the output device.

10. The method of claim 9, the first single-channel audio information comprising one of a right channel or a left channel of stereo audio information, the second single-audio information comprising another of the right channel or the left channel of the stereo information.

11. The method of claim 9, further comprising identifying, with the one or more control circuits, that the wireless communication device is, in an initial state, to operate as a master device to the paired wireless communication device.

12. The method of claim 9, the identifying occurring when an optical communication node of the wireless communication device receives reflections while coupled to a wireless communication device accessory.

13. The method of claim 9, further comprising:
  detecting, with the one or more control circuits, actuation of a user interface actuator for at least a predetermined duration; and
  determining, with the one or more control circuits, whether the wireless communication device is disposed at a first predefined location or a second predefined location; and
  the identifying occurring only where the wireless communication device is disposed at the first predefined location.

14. The method of claim 13, wherein the wireless communication device is disposed at the first predefined location, the method further comprising pairing the wireless communication device to the paired wireless communication device.

15. The method of claim 13, the determining comprising receiving, with an optical communication node, reflections of signals emitted by the optical communication node.

16. A wireless communication device, comprising:
  one or more control circuits; a wireless communication circuit operable with the one or more control circuits; and an audio output device operable with the one or more control circuits; the one or more control circuits to:
  receive audio source information identifying a remote electronic device from a paired wireless communication device;
  detect, with the wireless communication device, whether the paired wireless communication device is within a communication radius; and
  where the paired wireless communication device is within the communication radius:
  receive, with the wireless communication circuit, single-channel audio information from the paired wireless communication device; and
  deliver the single-channel audio information to the audio output device; and
  where the paired wireless communication device is outside the communication radius:
  connect, with the wireless communication circuit, the wireless communication device to the remote electronic device identified by the audio source information;
  receive, with the wireless communication circuit, multi-channel audio information from the remote electronic device; and deliver the multi-channel audio information to the audio output device.

17. The wireless communication device of claim 16, the wireless communication device comprising a wireless ear bud device.

18. The wireless communication device of claim 16, further comprising:
  a housing;
  a user interface actuator disposed along the housing; and
  a location detector operable with the one or more control circuits;
  the one or more control circuits further to:
    detect, with the user interface actuator, actuation of the user interface actuator for at least a predetermined duration;
    determine, with the location detector, whether the wireless communication device is disposed at a predefined location; and where the wireless communication device is disposed at the predefined location, cause the wireless communication device to become, in a default state, a slave device to the paired wireless communication device.

19. The wireless communication device of claim 18, the location detector comprising an optical communication node, the one or more control circuits to determine whether the wireless communication device is disposed at the predefined location by identifying, with the optical communication node, whether signals emitted by the optical communication node are reflected back to the optical communication node.

20. The wireless communication device of claim 16, further comprising the paired wireless communication device, the multi-channel audio information from the remote electronic device comprising stereo audio information, the single-channel audio information comprising one of right channel audio information or left channel audio information.

* * * * *